(12) United States Patent
Inazumi

(10) Patent No.: US 9,050,721 B2
(45) Date of Patent: Jun. 9, 2015

(54) ROBOT CONTROLLER, ROBOT SYSTEM, ROBOT CONTROL METHOD

(71) Applicant: Seiko Epson Corporation, Tokyo (JP)

(72) Inventor: Mitsuhiro Inazumi, Shiojiri (JP)

(73) Assignee: Seiko Epson Corporation (JP)

( * ) Notice: Subject to any disclaimer, the term of this patent is extended or adjusted under 35 U.S.C. 154(b) by 59 days.

(21) Appl. No.: 13/742,744

(22) Filed: Jan. 16, 2013

(65) Prior Publication Data

US 2013/0184869 A1 Jul. 18, 2013

(30) Foreign Application Priority Data

Jan. 17, 2012 (JP) ................................. 2012-006776

(51) Int. Cl.
*G06F 19/00* (2011.01)
*B25J 9/16* (2006.01)

(52) U.S. Cl.
CPC .............. *B25J 9/1612* (2013.01); *B25J 9/1633* (2013.01); *G05B 2219/39322* (2013.01); *G05B 2219/39343* (2013.01)

(58) Field of Classification Search
CPC ................... B65D 57/032; G05B 2219/45083; A61B 5/4528; B25J 9/1633
USPC ........... 700/245, 260, 261; 901/9; 318/568.12
See application file for complete search history.

(56) References Cited

U.S. PATENT DOCUMENTS

| | | |
|---|---|---|
| 4,547,858 A | 10/1985 | Horak |
| 4,860,215 A | 8/1989 | Seraji |
| 5,023,808 A | 6/1991 | Seraji |
| 5,129,044 A | 7/1992 | Kashiwagi et al. |
| 5,206,930 A | 4/1993 | Ishikawa et al. |
| 5,497,061 A | 3/1996 | Nonaka et al. |
| 6,505,096 B2 | 1/2003 | Takenaka et al. |
| 7,112,938 B2* | 9/2006 | Takenaka et al. ........ 318/568.12 |
| 7,508,155 B2 | 3/2009 | Sato et al. |
| 7,558,647 B2 | 7/2009 | Okazaki |

(Continued)

FOREIGN PATENT DOCUMENTS

| | | |
|---|---|---|
| EP | 1 930 131 A2 | 6/2008 |
| JP | 61-264414 | 11/1986 |

(Continued)

OTHER PUBLICATIONS

Extended European Search Report for Application No. EP 13 15 1288 mailed Jun. 6, 2013 (8 pages).

(Continued)

*Primary Examiner* — McDieunel Marc
(74) *Attorney, Agent, or Firm* — Harness, Dickey & Pierce, P.L.C.

(57) ABSTRACT

A robot controller includes a force control unit that outputs a correction value of a target track of a robot based on a detected sensor value acquired from a force sensor, a target value output unit that obtains a target value by performing correction processing on the target track based on the correction value and outputs the obtained target value, and a robot control unit that performs feedback control of the robot based on the target value. Further, the force control unit performs first force control when an external force direction indicated by the detected sensor value is a first direction, and performs second force control different from the first force control when the external force direction is a second direction opposite to the first direction.

14 Claims, 22 Drawing Sheets

(56) References Cited

U.S. PATENT DOCUMENTS

| | | | |
|---|---|---|---|
| 8,204,626 B2* | 6/2012 | Yoshiike et al. | 700/260 |
| 8,306,657 B2* | 11/2012 | Yoshiike et al. | 700/246 |
| 8,311,677 B2* | 11/2012 | Yoshiike et al. | 700/260 |
| 8,442,680 B2* | 5/2013 | Orita | 700/254 |
| 2003/0009259 A1* | 1/2003 | Hattori et al. | 700/245 |
| 2008/0140257 A1 | 6/2008 | Sato et al. | |
| 2010/0234999 A1 | 9/2010 | Nakajima | |
| 2011/0098856 A1* | 4/2011 | Yoshiike et al. | 700/246 |
| 2011/0098860 A1* | 4/2011 | Yoshiike et al. | 700/260 |
| 2011/0166709 A1 | 7/2011 | Kim et al. | |
| 2011/0213495 A1* | 9/2011 | Orita | 700/254 |
| 2011/0213496 A1* | 9/2011 | Orita | 700/254 |
| 2012/0072026 A1* | 3/2012 | Takagi | 700/261 |
| 2013/0184868 A1* | 7/2013 | Inazumi | 700/258 |

FOREIGN PATENT DOCUMENTS

| | | |
|---|---|---|
| JP | 64-044510 | 2/1989 |
| JP | 04-306712 | 10/1992 |
| JP | 05-108108 | 4/1993 |
| JP | 06-170763 | 6/1994 |
| JP | 06-246673 | 9/1994 |
| JP | 07-024665 | 1/1995 |
| JP | 07-210250 | 8/1995 |
| JP | 08-243958 | 9/1996 |
| JP | 09-185416 | 7/1997 |
| JP | 10-128685 | 5/1998 |
| JP | 10-151590 | 6/1998 |
| JP | 10-230485 | 9/1998 |
| JP | 2000-218577 A | 8/2000 |
| JP | 3412324 | 3/2003 |
| JP | 2004-058191 | 2/2004 |
| JP | 2005-334999 | 12/2005 |
| JP | 2011-008360 | 1/2011 |

OTHER PUBLICATIONS

Extended European Search Report for Application No. EP 13 15 1284 mailed Jun. 6, 2013 (11 pages).

Seraji, Homayoun, "Nonlinear and Adaptive Control of Force and Compliance in Manipulators", International Journal of Robotics Research, Sage Science Press, Thousand Oaks, US, vol. 17, No. 5, May 1, 1998, pp. 467-484, XP000754908.

Seraji, Homayoun et al., "Nonlinear Contact Control for Space Station Dexterous Arms", Robotics and Automation, 1998, Proceedings, IEEE International Conference on Leuven, Belgium, May 16-20, 1998, New York, NY, US, IEEE, vol. 1, pp. 899-906, SP010281097.

Baptista, L.F. et al., "Predictive Force Control of Robot Manipulators in Nonrigid Environments", from Industrial Robotics: Theory, Modeling and Control, Chapter 31, Dec. 2006, pp. 841-874.

Champagne, Benoit et al., "Discrete Time Signal Processing: Class Notes for the Course ECSE-412", Chapter 9 (Filter Design), pp. 166-199, downloaded from: http://ens.ewi.tudelft.nl/Education/courses/et2405/notes/champagne04.pdf.

Morales, B. et al., "Robot Control With Inverse Dynamics and Non-Linear Gains", Latin American applied research, 2009, 5 pages.

Seraji, Homayoun, "A New Class of Nonlinear PID Controllers With Robot Applications", Journal of Robotic Systems 15(3), 1998, pp. 161-181.

* cited by examiner

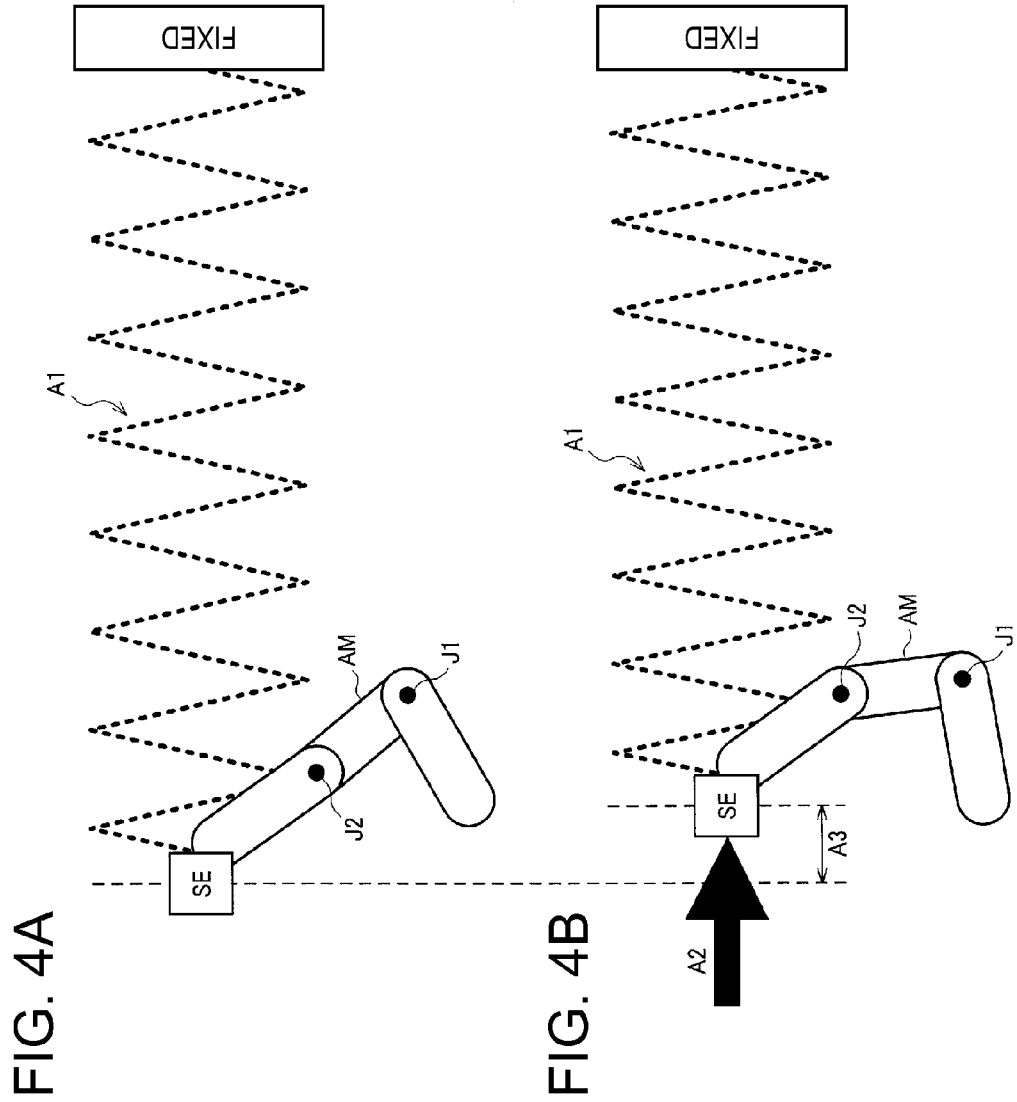

ROBOT CONTROLLER, ROBOT SYSTEM, ROBOT CONTROL METHOD

BACKGROUND

1. Technical Field

The present invention relates to a robot controller, a robot system, and a robot control method.

2. Related Art

Operations using robots such as manipulators include operations with various constraints, for example, in contact with objects. In these cases, force control is often required in addition to location control. For example, in the cases of tracing the surface of an object, fitting one object into another object, and grasping a soft object so as to not break it, and the like, movement in response to the reaction force from the object is necessary in addition to simple location control.

Representative methods of force control in robots include a method called impedance control. Impedance control is a control method of moving a robot, regardless of its real mass, viscosity property, and elasticity property, as if it had those values suitable for an operation. This is a control method of solving an equation of motion based on force information obtained from a force sensor attached to the robot and moving the robot according to the solution. By appropriately setting the equation of motion, a robot such as a manipulator can be moved as if it had predetermined mass, viscosity, and elasticity.

Note that, in impedance control, in order to allow the robot to behave as if it had desired properties (mass, viscosity property, elasticity property), it is necessary to solve an ordinary differential equation using coefficient parameters corresponding to the properties (an equation of motion as a second-order linear differential equation). Various methods of solving the differential equation have been known, and the Runge-Kutta method, the Newton method, or the like is used.

As a related art with respect to impedance control and force control, a technology disclosed in JP-A-10-128685 is known.

Since the above described differential equation in impedance control is linear, the impedance control has a symmetric characteristic with respect to the direction (orientation) of force (external force).

However, when a human performs an operation, sometimes he or she controls force so that displacement may be asymmetric with respect to the external force direction. For example, when an object is inserted into a device having some pull-in mechanism, force is applied against the repulsive force from the device, and, once the pull-in mechanism is activated and the force is changed to pull-in force, the human moves according to the force, i.e., has a "soft" characteristic. Therefore, when the robot performs an operation like a human, asymmetric impedance control is necessary.

Here, in JP-A-10-128685, a method of providing non-linearity by using a function that is non-linear with respect to virtual displacement for the compliance term (elasticity term) of the equation of motion in the force control is disclosed. There is no explicit description in the specification of JP-A-10-128685, however, it is conceivable that the non-linear compliance term includes an asymmetric compliance term, and thereby, it is also conceivable that asymmetric impedance control may be realized.

However, the method provides the asymmetry with respect to the location (displacement), but does not provide asymmetry of the displacement (correction value) with respect to the force direction as described above. That is, according to the method disclosed in JP-A-10-128685, the impedance control providing asymmetric displacement with respect to the force direction may be realized.

SUMMARY

An advantage of some aspects of the invention is to provide a robot controller, a robot system, and a robot control method that perform impedance control with an asymmetric correction value with respect to a force direction.

An aspect of the invention relates to a robot controller including a force control unit that outputs a correction value of a target track of a robot based on a detected sensor value acquired from a force sensor, a target value output unit that obtains a target value by performing correction processing on the target track based on the correction value and outputs the obtained target value, and a robot control unit that performs feedback control of the robot based on the target value, wherein the force control unit performs first force control when an external force direction indicated by the detected sensor value is a first direction, and performs second force control different from the first force control when the external force direction is a second direction opposite to the first direction.

Thereby, impedance control by which an amount of change of displacement is asymmetric with respect to the external force direction can be performed.

In the aspect of the invention, the force control unit may perform force control by which an amount of displacement change with respect to external force is a first amount of displacement change as the first force control when the external force direction is the first direction, and perform force control by which the amount of displacement change with respect to external force is a second amount of displacement change different from the first amount of displacement change as the second force control when the external force direction is the second direction.

Thereby, for example, force control of increasing the amount of displacement change can be performed when external force in the first direction is detected, and force control of reducing the amount of displacement change can be performed when external force in the second direction is detected.

In the aspect of the invention, the force control unit may perform the first force control of outputting a first correction value corresponding to the first amount of displacement change when the external force direction is the first direction, and perform the second force control of outputting a second correction value corresponding to the second amount of displacement change when the external force direction is the second direction.

Thereby, output of the correction value varying in response to the external force direction or the like can be performed.

In the aspect of the invention, the force control unit may include an external force direction determination part that determines the external force direction indicated by the detected sensor value.

Thereby, a determination of the external force direction or the like can be performed.

In the aspect of the invention, the force control unit may have a control parameter memory that stores plural sets of control parameters in force control, and a control parameter selector that performs selection processing of the set of control parameters to be used from the sets of control parameters stored in the control parameter memory, and the force control unit may perform the selection processing of selecting a first set of control parameters when the external force direction indicated by the detected sensor value is the first direction, perform the selection processing of selecting a second set of control parameters when the external force direction is the second direction, and obtain a solution of a differential equation in force control as the correction value using the selected set of control parameters and output the correction value.

Thereby, by switching the sets of control parameters to be used for impedance control, realization of asymmetric impedance control or the like can be achieved.

In the aspect of the invention, the force control unit may perform changing processing of changing the set of control parameters to be used from the first set of control parameters to the second set of control parameters if a determination that a predetermined control parameter change command has been issued is made when performing force control using the first set of control parameters.

Thereby, if the predetermined control parameter change command is issued, changing of the set of control parameters to be used or the like can be performed.

In the aspect of the invention, the force control unit may perform the changing processing of changing the set of control parameters to be used to the first set of control parameters if a determination that a magnitude of external force in the first direction has exceeded a first threshold value is made when performing force control using the second set of control parameters, and perform the changing processing of changing the set of control parameters to be used to the second set of control parameters if a determination that a magnitude of external force in the second direction has exceeded a second threshold value is made when performing force control using the first set of control parameters.

Thereby, a hysteresis characteristic may be provided to the change control of the set of control parameters, and avoidance of frequent changes of the set of control parameters to be used or the like can be performed.

In the aspect of the invention, the force control unit may perform weighting processing on a first correction value obtained by the first force control and a second correction value obtained by the second force control to obtain a third correction value and output the obtained third correction value when the external force direction indicated by the detected sensor value is the second direction.

Thereby, output values when digital filter processing is performed are obtained using parameters of the digital filter, the correction values are obtained by weighting of the respective output values, and realization of the asymmetric impedance control or the like can be achieved.

In the aspect of the invention, the force control unit may have a digital filter that obtains a solution of a differential equation in force control as the correction value.

Thereby, processing for force control of obtaining the solution of the differential equation can be performed using the digital filter, and realization as hardware or the like can be facilitated.

In the aspect of the invention, the force control unit may determine stability of an operation of the digital filter of obtaining the correction value, and obtain the solution of the differential equation in force control as the correction value if a determination that the operation of the digital filter is stable is made.

Thereby, a determination of the stability of the digital filter or the like can be performed.

In the aspect of the invention, the differential equation may be an equation of motion having a virtual mass term, a virtual viscosity term, and a virtual elasticity term as coefficient parameters.

Thereby, obtainment of the solution of the equation of motion or the like can be performed.

Another aspect of the invention relates to a robot system including the robot controller, and the robot that moves the respective parts based on the target value acquired from the target value output unit.

Thereby, not only the robot controller but also realization of the robot system executing the processing of the embodiment or the like can be achieved.

Still another aspect of the invention relates to a robot control method including obtaining a solution of a differential equation in force control as a correction value of a target track of a robot based on a detected sensor value acquired from a force sensor, performing first force control when an external force direction indicated by the detected sensor value is a first direction, performing second force control different from the first force control when the external force direction is a second direction opposite to the first direction, obtaining a target value by performing correction processing on the target track based on the correction value and outputting the obtained target value, and performing feedback control of the robot based on the target value.

The robot control method of the still another aspect of the invention may further include performing force control by which an amount of displacement change with respect to external force is a first amount of displacement change as the first force control when the external force direction is the first direction, and performing force control by which the amount of displacement change with respect to external force is a second amount of displacement change different from the first amount of displacement change as the second force control when the external force direction is the second direction.

Yet another aspect of the invention relates to a robot control method of performing control of a robot having a force sensor, including performing force control by which a magnitude of displacement of the robot varies in response to a direction of external force applied to the force sensor.

The robot control method of the yet another aspect of the invention may further include performing control of a robot having a force sensor, including performing force control by which a magnitude of displacement of the robot when first external force is applied to the force sensor and a magnitude of displacement of the robot when second external force having the same magnitude in an opposite direction to the first external force is applied to the force sensor are different.

BRIEF DESCRIPTION OF THE DRAWINGS

The invention will be described with reference to the accompanying drawings, wherein like numbers reference like elements.

FIGS. 4A and 4B are explanatory diagrams of compliance control.

DESCRIPTION OF EXEMPLARY EMBODIMENTS

Below, embodiments will be explained. First, the basic configuration and control of the embodiments will be explained. Thereafter, the first embodiment and the second embodiment will be respectively explained including system configuration examples and detailed processing. Note that the embodiments to be explained do not unduly limit the invention described in the appended claims. Further, all of the configurations to be explained in the embodiments are not necessarily essential structural elements of the invention.

1. Outline 1.1 Basic Configuration

Figure 1:
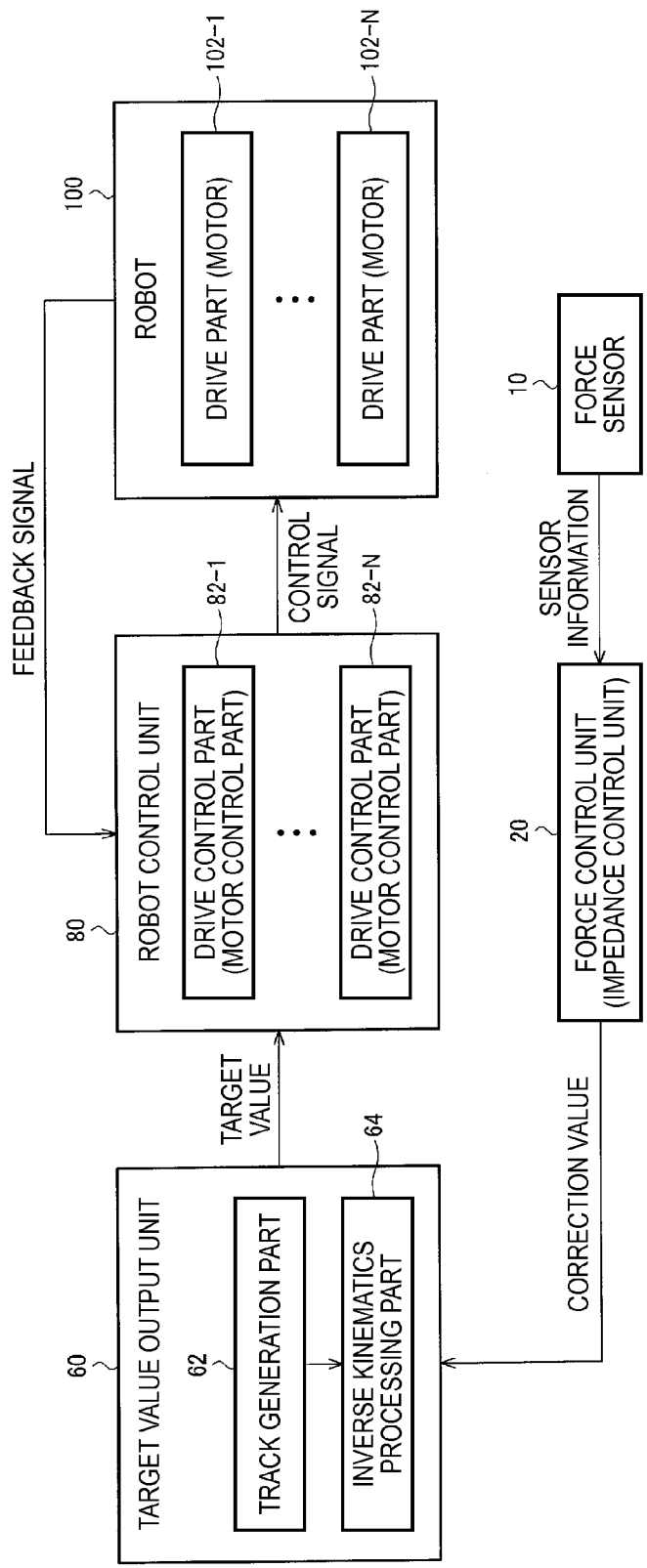
FIG. 1 shows a basic configuration example of a robot controller and a robot system.

FIG. 1 shows a configuration example of a robot controller (manipulator controller) and a robot system including the controller of the embodiment. Note that the robot controller and the robot system of the embodiment are not limited to those having the configuration in FIG. 1, and various modifications can be made by omitting part of their component elements and/or adding other component elements.

The robot controller of the embodiment includes a force control unit 20, a target value output unit 60, and a robot control unit 80. Further, the robot system of the embodiment includes the robot controller and a robot 100 (force sensor 10).

The target value output unit 60 outputs a target value of feedback control of the robot (manipulator in a narrow sense). The feedback control of the robot 100 is realized based on the target value. In a multi-joint robot as an example, the target value is joint angle information of the robot or the like. The joint angle information of the robot is information representing angles of the respective joints (angles formed by joint axes and joint axes) in a link mechanism of arms of the robot, for example.

The target value output unit 60 may include a track generation part 62 and an inverse kinematics processor 64. The track generation part 62 outputs track information of the robot. The track information may include location information (x, y, z) of an end effector part (end point) of the robot and rotation angle information (u, v, w) around the respective coordinate axes. The inverse kinematics processor 64 performs inverse kinematics processing based on the track information from the track generation part 62, and outputs the joint angle information of the robot as the target value, for example. The inverse kinematics processing calculates the movement of the robot having joints and calculates the joint angle information or the like from the location and position of the end effector of the robot using inverse kinematics.

The force control unit 20 (impedance control unit in a narrow sense) performs force control (force sense control) based on the sensor information from the force sensor 10 and outputs a correction value of the target value. Further, specifically, the force control unit 20 (impedance control unit) performs impedance control (or compliance control) based on sensor information (force information, moment information) from the force sensor 10. The force control is control with the addition of force feedback to location control in related art. The impedance control is a method of turning the ease of displacement (mechanical impedance) of the end effector part (hand) for external force into a desired condition by control. Specifically, the control is, in a model in which a mass, a viscosity coefficient, and an elastic element are connected to the end effector part of the robot, to bring the part into contact with an object with the mass, viscosity coefficient, and the elastic coefficient set as targets. Further, the force sensor 10 is a sensor that detects force as a reaction force against the force by the robot 100 and moment. The force sensor 10 is typically attached to the wrist part of the arm of the robot 100, and the detected force and moment is used for various force control (impedance control) as sensor information.

The robot control unit 80 performs feedback control of the robot 100 based on the target value obtained from the target value output unit 60. Specifically, the unit performs the feedback control of the robot 100 based on the target value output as a result of correction processing based on the correction value from the force control unit 20. For example, the unit performs the feedback control of the robot 100 based on the target value and a feedback signal from the robot 100. For example, the robot control unit 80 includes plural drive control parts 82-1 to 82-N (motor control parts in a narrow sense), and outputs their control signals to drive parts 102-1 to 102-N of the robot 100. Here, the drive parts 102-1 to 102-N are drive mechanisms for moving the respective joints of the robot 100 and realized by motors or the like, for example.

Figure 2A:
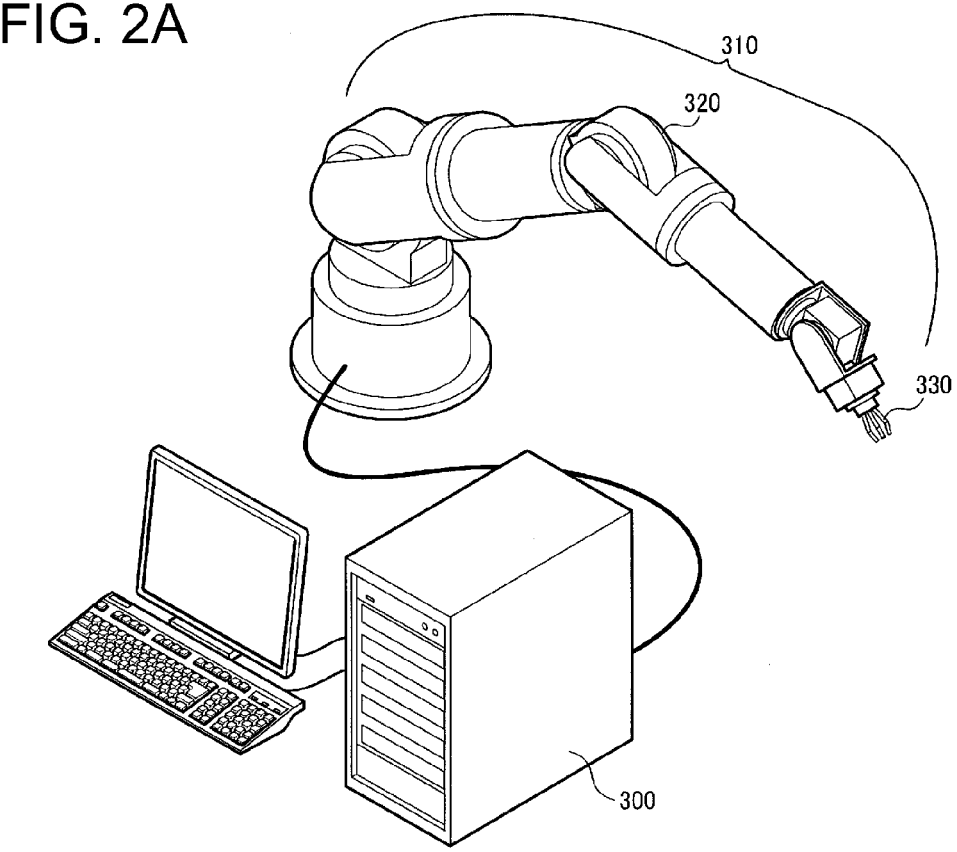
FIGS. 2A and 2B show examples of the robot systems.

Here, FIG. 2A shows an example of the robot system including the robot controller of the embodiment. The robot system includes a control device 300 (information processing unit) and a robot 310 (robot 100 in FIG. 1). The control device 300 performs control processing of the robot 310. Specifically, the device performs control of moving the robot 310 based on movement sequence information (scenario information). The robot 310 has an arm 320 and a hand (grasping part) 330, and moves according to the movement command from the control device 300. For example, the robot performs movement of grasping and moving work pieces placed on a pallet (not shown). Further, information of the position of the robot and the location of the work is detected based on taken image information acquired by an imaging device (not shown), and the detected information is sent to the control device 300.

The robot controller of the embodiment is provided in the control device 300 in FIG. 2A, for example, and the robot controller is realized by hardware and programs of the control device 300. Further, according to the robot controller of the embodiment, performance requirements for the control hardware of the control device 300 or the like may be reduced and the robot 310 may be moved with high responsiveness.

Figure 2B:
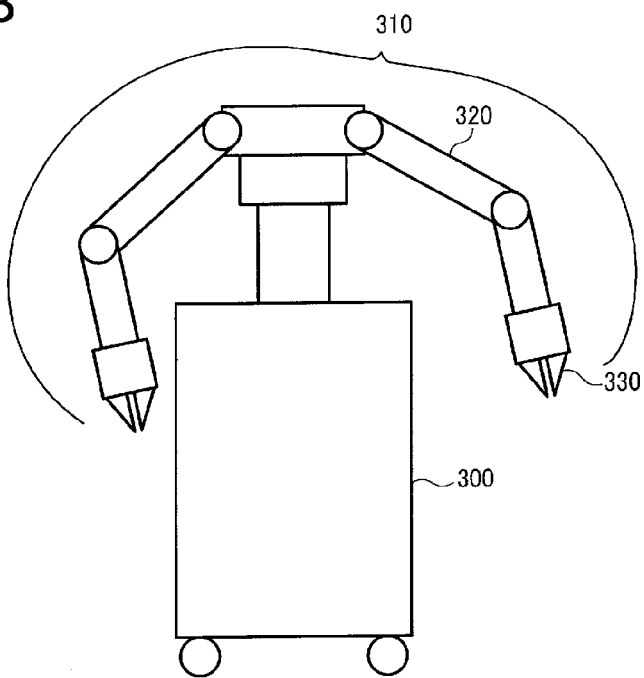

Further, the robot main body 310 (robot) and the control device 300 (robot controller) are separately formed in FIG. 2A, however, the robot of the embodiment is not limited to that having the configuration in FIG. 2A, and the robot main body 310 and the control device 300 may be integrally formed as shown in FIG. 2B. Specifically, as shown in FIG. 2B, the robot includes the robot main body 310 (having the arm 320 and the hand 330) and a base unit part that supports the robot main body 310, and the control device 300 is housed in the base unit part. In the robot in FIG. 2B, wheels or the like are provided in the base unit part so that the entire robot may be shifted (moved). Note that, though FIG. 2A shows the example of a single-arm type, the robot may be a multi-arm robot such as a dual-arm type as shown in FIG. 2B. Note that the robot may be manually shifted or motors for driving the wheels may be provided and the motors may be controlled by the control device 300 for shifting.

1.2 Force Control and Impedance Control

Next, the outline of the force control and the impedance control (compliance control) will be explained.

Figure 3A:
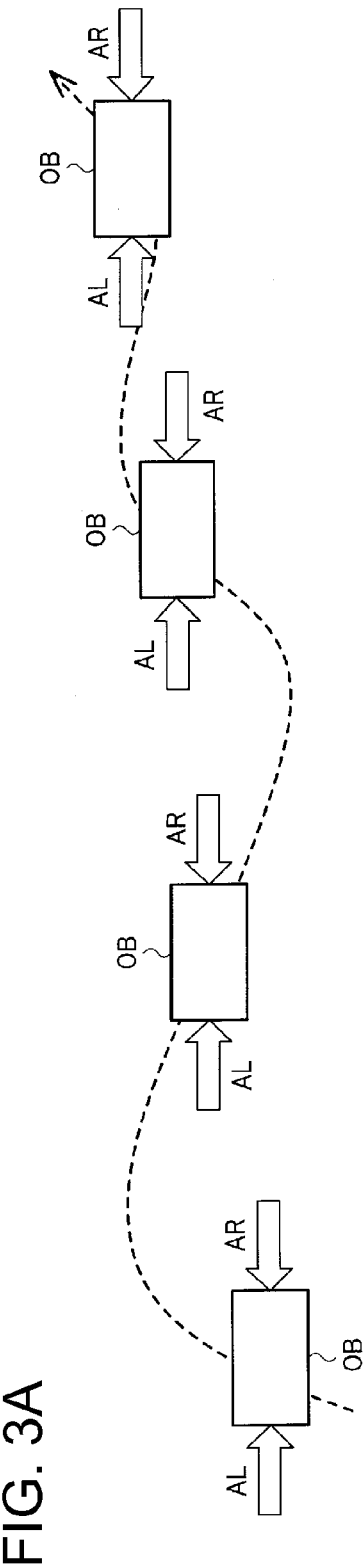
FIGS. 3A to 3C are explanatory diagrams of force control.

FIG. 3A shows shift of the robot gripping an object OB with a left arm AL and a right arm AR. For example, only by the location control, the object may be dropped or broken. According to the force control, soft objects and fragile objects can be gripped with appropriate force from both sides and shifted as shown in FIG. 3A.

Figure 3C:
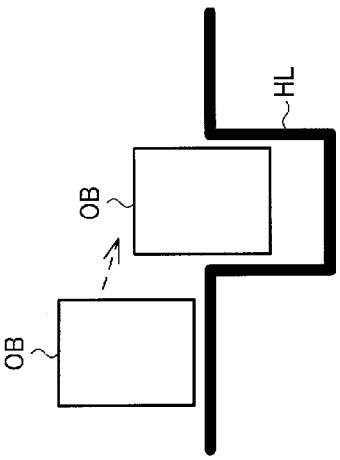
Figure 3B:
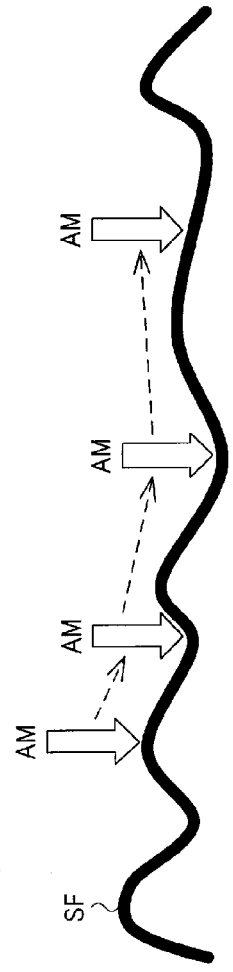

Further, according to the force control, as shown in FIG. 3B, a surface SF of an object with uncertainty may be traced by an arm AM or the like. It is impossible to realize such control only by the location control. Furthermore, according to the force control, as shown in FIG. 3C, after rough positioning, the object OB may be aligned by searching and fitted into a hole part HL.

However, the limited usage is problematic according to the force control using a real mechanical part such as a spring. In the force control using the mechanical part, dynamic switching between characteristics is difficult.

On the other hand, torque control of controlling the torque of a motor is easy, however, deterioration in location accuracy is problematic. Further, a problem of collision occurs in an emergency. For example, in FIG. 3A, when an emergency occurs and the object OB is dropped, in the torque control, the reaction forces to be balanced disappear and a problem that the left and right arms AL, AR collide with each other or the like occurs.

In contrast, impedance control (compliance control) is complex control, but has an advantage of higher versatility and safety.

FIGS. 4A and 4B are diagrams for explanation of the compliance control as one type of impedance control. Compliance refers to an inverse of a spring constant, and the spring constant indicates hardness and the compliance indicates softness. The control for providing the compliance as mechanical flexibility when an interaction acts between the robot and the environment is referred to as compliance control.

For example, in FIG. 4A, a force sensor SE is attached to an arm AM of the robot. The arm AM of the robot is programmed so that its position may be changed in response to sensor information (force and torque information) obtained by the force sensor SE. Specifically, the robot is controlled as if a virtual spring shown by A1 in FIG. 4A is attached to the tip end of the arm AM.

For example, the spring constant of the spring shown by A1 is 100 Kg/m. When the spring is pressed with force of 5 Kg as shown by A2 in FIG. 4B, the spring contracts by 5 cm as shown by A3. To put it another way, when the spring contracts by 5 cm, the spring is pressed with force of 5 Kg. That is, the force information and the location information are linearly and symmetrically associated.

In the compliance control, the control as if the virtual spring shown by A1 was attached to the tip end of the arm AM is performed. Specifically, the robot is controlled to move in response to the input of the force sensor SE and retract by 5 cm as shown by A3 for the weight of 5 Kg shown by A2, and controlled so that the location information may be changed in response to the force information.

Simple compliance control does not include the time term, however, control including the time term and considering the terms to the second-order term is the impedance control. Specifically, the second-order term is the mass term and the first-order term is the viscosity term, and the model of the impedance control may be expressed by an equation of motion as shown in the following equation (1).

$$f(t) = m\ddot{x} + \mu\dot{x} + kx \tag{1}$$

In the equation (1), m is a mass, $\mu$, is a coefficient of viscosity, k is an elastic modulus, f is force, and x is displacement from a target location. Further, the first derivation and the second derivation of x correspond to velocity and acceleration, respectively. In the impedance control, a control system for providing the property of the equation (1) to the end effector part as the tip end of the arm is constituted. That is, the control is performed as if the tip end of the arm had a virtual mass, a virtual coefficient of viscosity, and a virtual elastic modulus.

As described above, the impedance control is control, in a model in which the viscosity element and the elastic element are connected to the mass of the tip end of the arm in the respective directions, of bringing the arm in contact with an object with targeted coefficient of viscosity and elastic modulus.

Figure 5A:
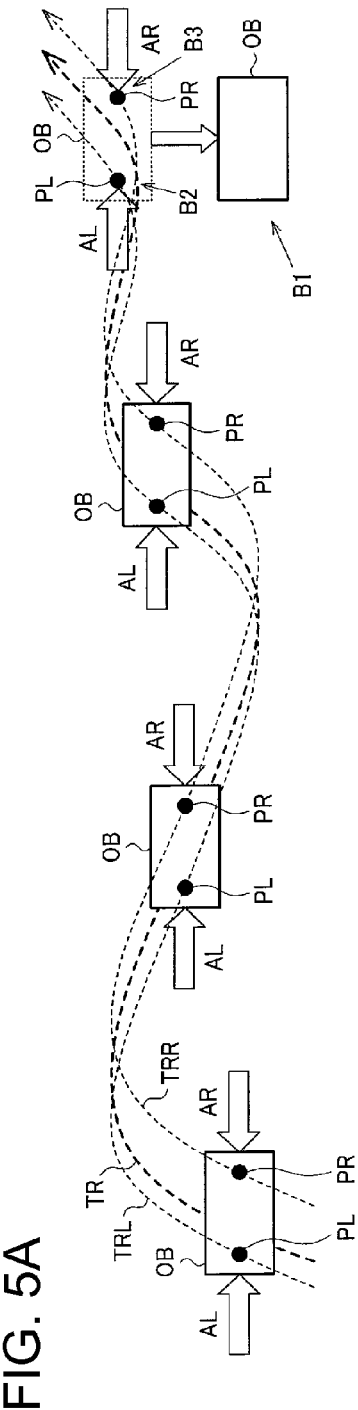
FIGS. 5A and 5B are explanatory diagrams of impedance control.

For example, as shown in FIG. 5A, control of gripping the object OB with the arms AL, AR of the robot and moving it along a track TR is considered. In this case, a track TRL is a track in which a point PL set inside of the left side of the object OB passes, and a virtual left-hand track determined in the assumption of the impedance control. Further, a track TRR is a track in which a point PR set inside of the right side of the object OB passes, and a virtual right-hand track determined in the assumption of the impedance control. In this case, the arm AL is controlled so that force in response to the distance difference between the tip end of the arm. AL and the point PL occurs. Further, the arm AR is controlled so that force in response to the distance difference between the tip end of the arm AR and the point PR occurs. In this manner, the impedance control of shifting the object OB while gripping it softly may be realized. Further, in the impedance control, even when the object OB is dropped as shown by B1 in FIG. 5A, the arms AL, AR are controlled so that their tip ends may be stopped in the locations of the points PL, PR as shown by B2, B3. That is, unless the virtual track is a collision track, the arms AL, AR may be prevented from colliding with each other.

Figure 5B:
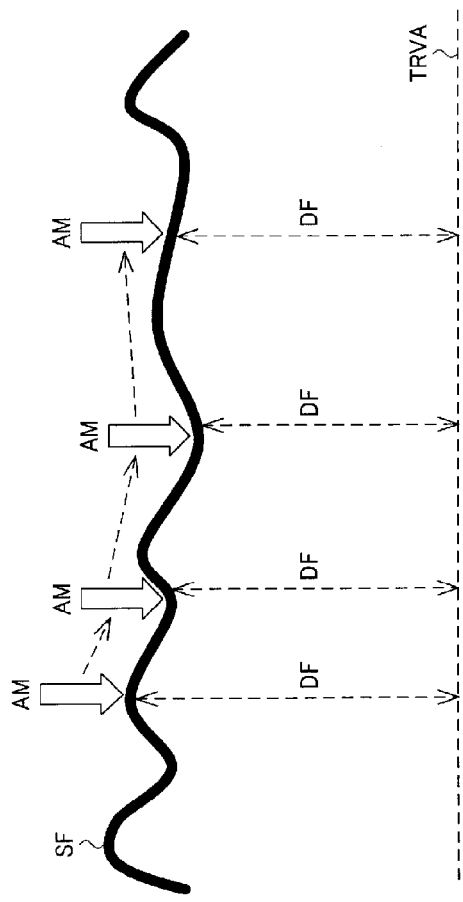

Further, as shown in FIG. 5B, in the case of the control of tracing the surface SF of the object, in the impedance control, control is performed so that force in response to a distance difference DF between a virtual track TRVA and the tip end may act on the tip end of the arm AM. Therefore, the control of tracing the surface SF while applying force to the arm AM can be performed.

These examples show linear and symmetric impedance control. Note that, here, the linear impedance control refers to impedance control by which displacement changes linearly with respect to external force, and the nonlinear impedance control refers to impedance control by which displacement changes non-linearly with respect to external force. Further, the symmetric impedance control refers to impedance control by which displacement is symmetric with respect to the external force direction, and the asymmetric impedance control refers to impedance control by which displacement is asymmetric with respect to the external force direction.

1.3 Asymmetric Impedance Control

Figure 6A:
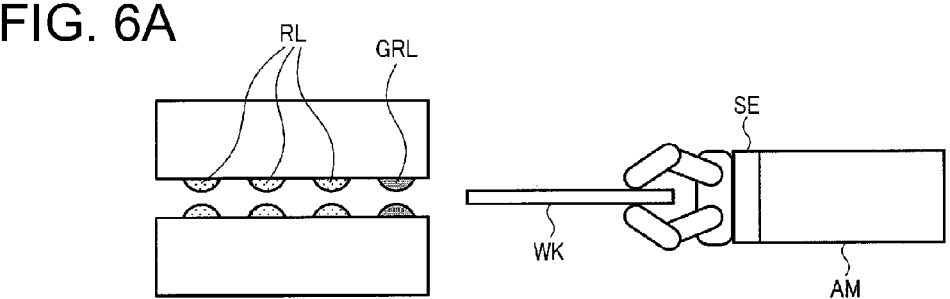
FIGS. 6A to 6C are explanatory diagrams of cases requiring asymmetric impedance control.
Figure 6B:
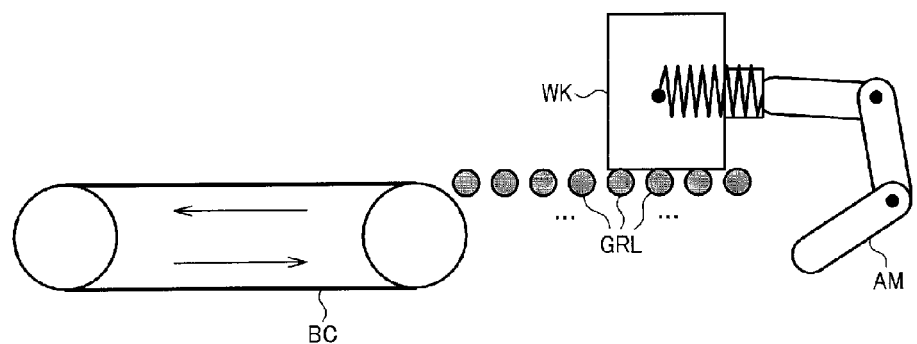
Figure 6C:
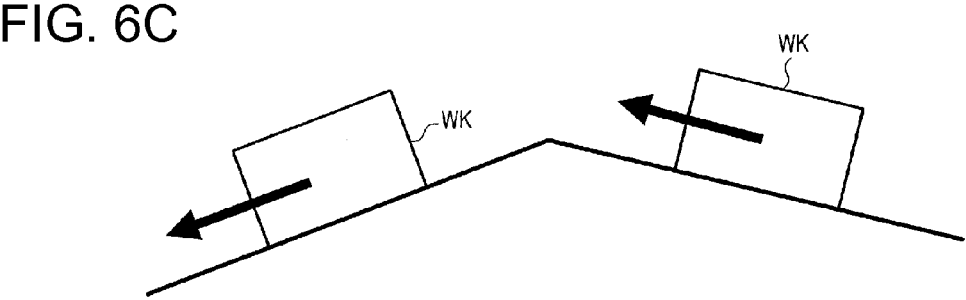

However, the linear and symmetric impedance control does not sufficiently deal with the cases where different force controls as shown in FIGS. 6A to 6C are required in response to the external force directions.

Here, the impedance controls required in FIGS. 6A to 6C will be specifically explained.

First, FIG. 6A shows a state in which the arm AM of the robot inserts work WK (a work piece) into a device having a roller part RL as a pull-in mechanism and additionally a guide roller part GRL. Note that the guide roller part GRL is a roller without the pull-in mechanism, and the force sensor SE is provided at the tip end of the arm AM.

In this example, when the leading end of the work WK is in contact with the guide roller part GRL, the force sensor SE detects the force toward the right. In this regard, it is desirable to perform rigid force control against the rightward external force. That is, the amount of change of the displacement with respect to the external force should be made smaller.

Further, when the work WK is pressed by the arm AM and moves to the right and the leading end of the work WK is brought into contact with the roller part RL, the force sensor detects force toward the left. This is because the roller part RL pulls in the work WK. In this example, the purpose is to press the work WK into the device, and subsequently, flexible force control of moving the work according to the leftward external force should be performed. In other words, the amount of change of the displacement with respect to the external force should be made larger.

In the example in FIG. 6B, like in the example in FIG. 6A, when the work WK is shifted on the guide roller part GRL, the force control against the rightward external force is performed, and, when the work WK is brought into contact with a belt conveyer part BC, passive force control with respect to the leftward external force should be performed.

Furthermore, in the case of FIG. 6C, like in the examples in FIGS. 6A and 6B, it is desirable to perform control of reducing the amount of displacement change when the work moves up along the slope, and perform control of increasing the amount of displacement change when the work moves down along the slope.

Next, the difference between the symmetric impedance control and the asymmetric impedance control will be explained using FIGS. 7A to 7D in view of the relationships between external force and displacement in the respective force controls. Note that, for example, when FIGS. 7A to 7D are considered in application to the example in FIG. 6A, the rightward force on the work WK when the work is "pressed in" is expressed as negative external force, and the leftward force on the work WK when the work is "pulled" by the roller part RL is expressed as positive external force.

Figure 7A:
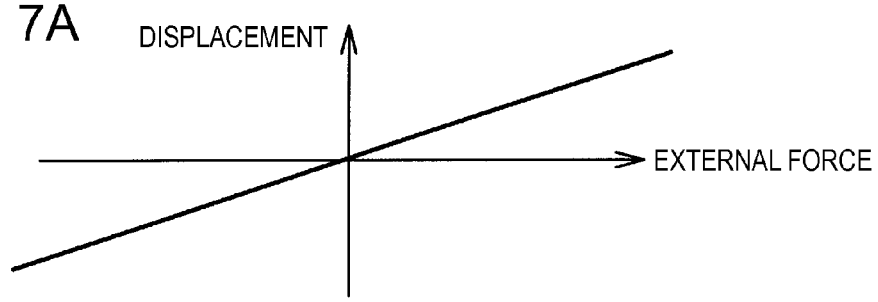
FIGS. 7A to 7D are explanatory diagrams of the relationships between external force and displacement in respective force controls.

First, FIG. 7A shows an example of the linear and symmetric impedance control. That is, the graph of FIG. 7A shows that, as external force becomes larger, displacement also becomes larger in proportion. The relationship holds between the external force and the displacement in the above described FIGS. 5A and 5B.

Figure 7B:
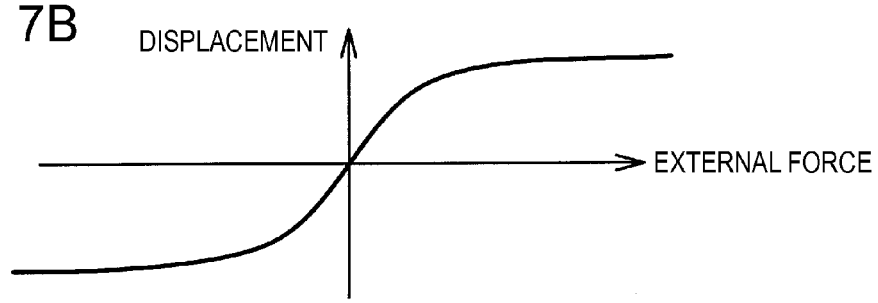

Next, FIG. 7B shows an example of nonlinear impedance control of suppressing displacement when external force becomes larger to a predetermined threshold value or more.

In the symmetric impedance control shown in FIGS. 7A and 7B, even when the external force direction changes, the relationship between the external force and the displacement does not change. That is, in FIGS. 7A and 7B, when the magnitudes of the external forces are the same, the magnitudes of the displacement (absolute values) are also the same regardless whether the external force direction is the first direction (rightward) or the second direction (leftward) opposite to the first direction.

Next, an ideal relationship between external force and displacement obtained in the case as shown in FIG. 6A and force control realizing the relationship will be explained. Note that, for clear explanation, only the compliance control will be explained, however, the relationship is also applicable to the impedance control, and is not limited to the compliance control.

First, the conclusion is that, in the first embodiment and the second embodiment, which will be described later, as the force control obtained in the case as shown in FIG. 6A, force control of providing an asymmetric relationship between the direction of external force applied to the force sensor and the magnitude of displacement of the robot when the external force is applied is performed. That is, force control of varying the magnitude of the displacement of the robot is performed in response to the direction of external force applied to the force sensor.

Here, specifically, the following equation (2) as an equation of motion with the compliance term (elasticity term) in equation (1) replaced by a function g(x) of x is considered.

$$f(t)=m\ddot{x}+\mu\dot{x}+g(x) \qquad (2)$$

Figure 7C:
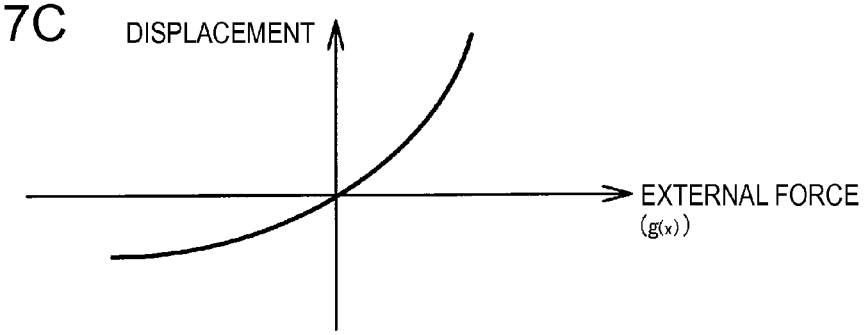

For example, when g(x) in equation (2) has a curved line shape as shown in FIG. 7C, a structure that is rigid for the rightward external force on the work WK in FIG. 6A when the work is pressed in and flexible for the leftward external force on the work WK when the work is pulled in seems to be realized. By performing the impedance control, the asymmetry with respect to the external force direction may be acquired.

However, to be precise, the g(x) is the function of displacement x, and the control parameter does not change depending on the external force direction. That is, the response characteristic changes in the range in which the external force direction does not change, and slightly differs from the response characteristic obtained in FIG. 6A. For example, the characteristic as shown in FIG. 7D to be described below is really desired.

Figure 7D:
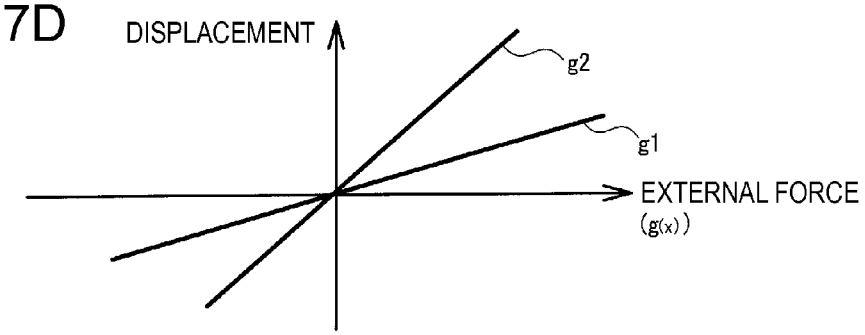

In the asymmetric impedance control as shown in FIG. 7D, the relationship between external force and displacement with respect to the first direction is like the straight line of g1, and the relationship between external force and displacement with respect to the second direction opposite to the first direction is like the straight line of g2. That is, unlike the symmetric impedance control shown in FIGS. 7A and 7B, the amounts of displacement change with respect to external force (i.e., gradients of the straight lines of g1 and g2) are different between when the external force direction is the first direction and the external force direction is the second direction. In other words, the relationships between external force and displacement are different in response to the external force direction.

Specifically, the rigid force control by which the displacement follows the curved line of g1 and is hard to change even when the external force becomes larger is performed with respect to the rightward external force on the work WK when the work is pressed in FIG. 6A, and the flexible force control by which the displacement follows the curved line of g2 and the displacement is easy to change even for the smaller external force is realized with respect to the leftward external force on the work WK when the work is pulled in.

As described above, a robot controller is proposed that performs asymmetric impedance control as shown in FIG. 7D for the cases as shown in FIGS. 6A to 6C, for example.

1.4 Configuration of Control System

Figure 8:
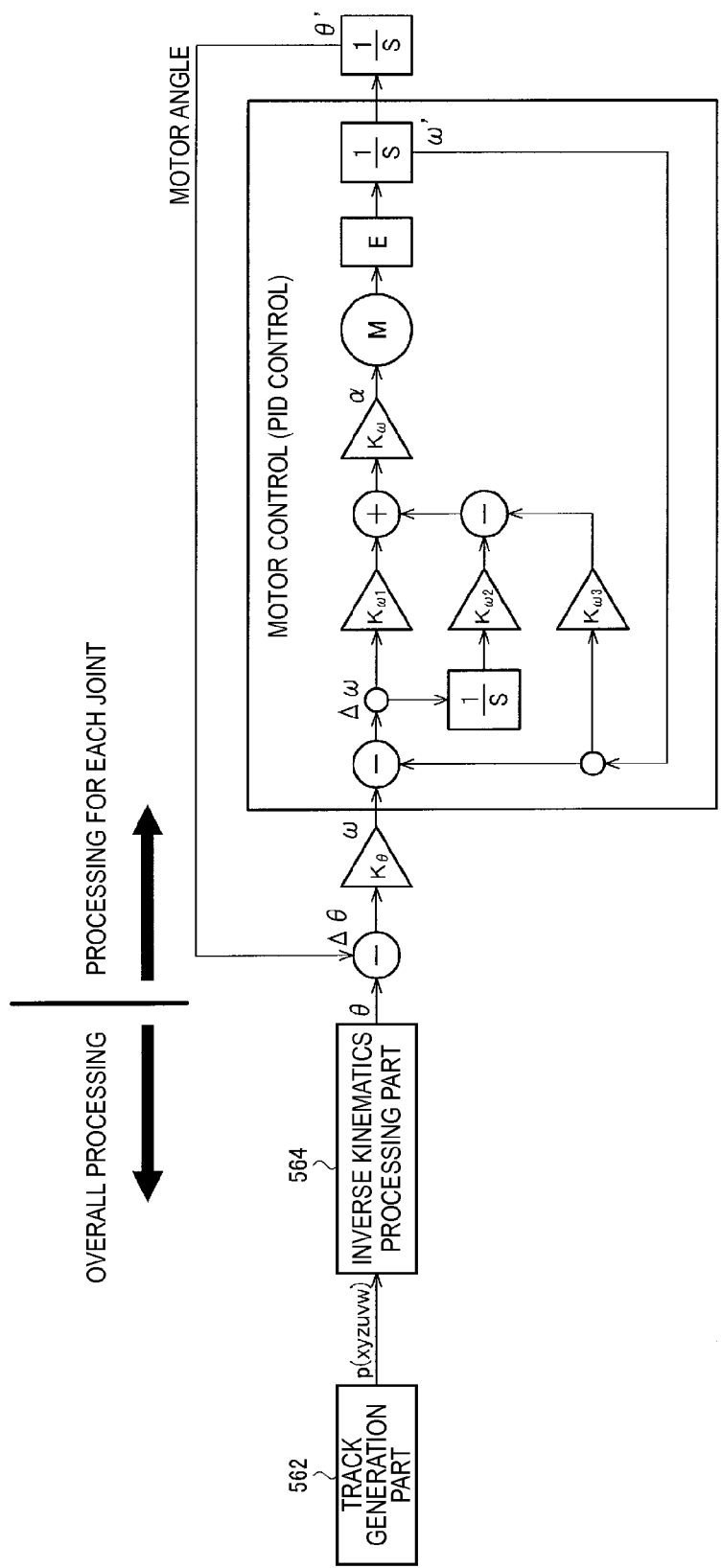
FIG. 8 shows a basic configuration example of a control system that does not include force sense feedback.

Here, FIG. 8 shows a basic configuration example of a control system that does not include force sense feedback.

A track generation part 562 generates track information p (xyzuvw) and outputs it to an inverse kinematics processor 564. Here, the track information p includes location information (xyz) of the tip end of the arm (end effector part) and rotation information (uvw) around the respective axes, for example. Further, the inverse kinematics processor 564 performs inverse kinematics processing based on the track information p, and generates and outputs a joint angle θ of each joint as a target value. Then, motor control is performed based on the joint angle θ, and thereby, movement control of the arm of the robot is performed. In this case, the control of the motor (M) in FIG. 8 is realized by known PID control. Since the PID control is a known technology, its detailed explanation is omitted here.

In FIG. 8, the track generation part 562 and the inverse kinematics processor 564 form a target value output unit. The processing of the target value output unit is overall processing of the robot. On the other hand, the downstream motor control is control with respect to each joint.

Figure 9:
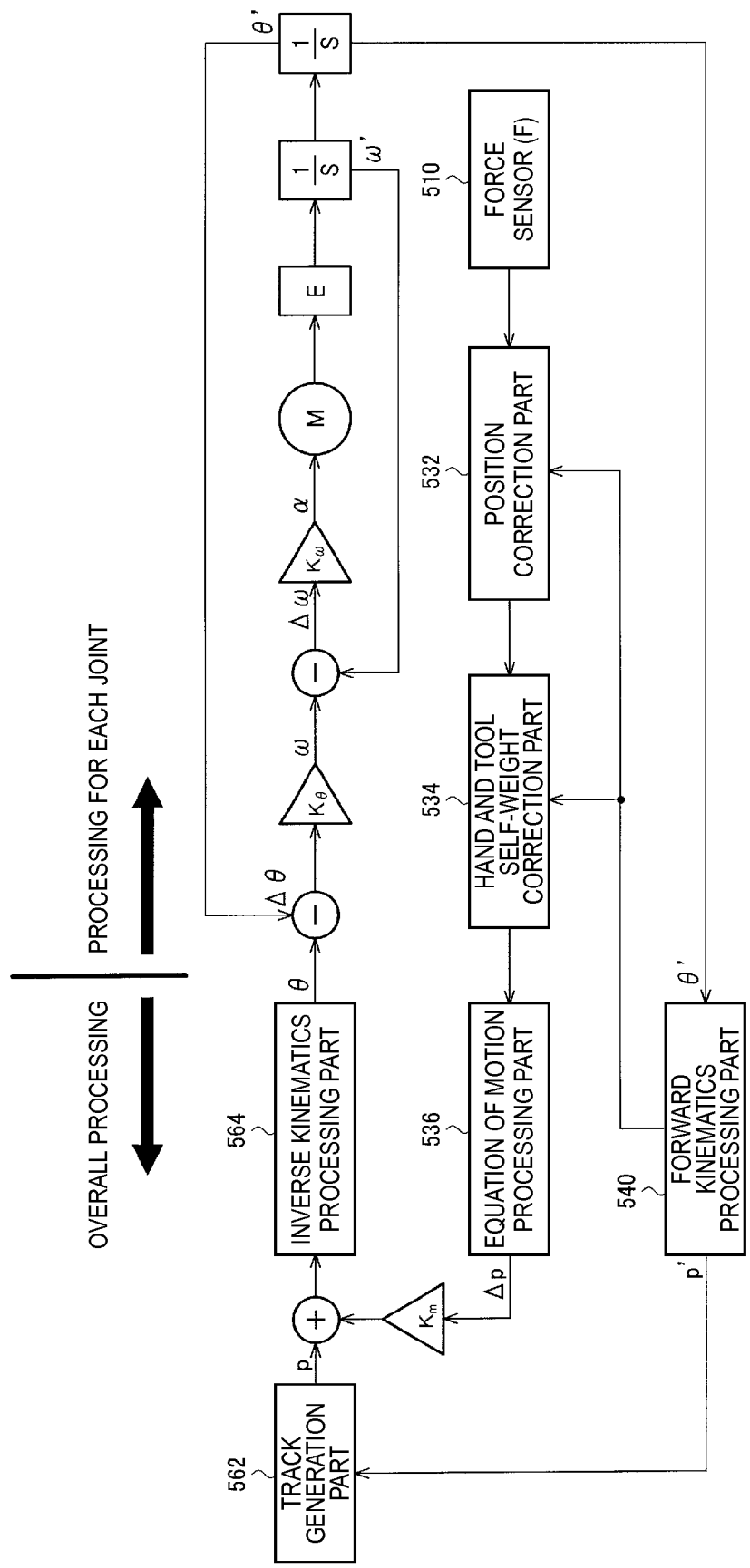
FIG. 9 shows a basic configuration example of a control system including force sense feedback.

FIG. 9 shows a basic configuration example of a control system including force sense feedback. In FIG. 9, compared to FIG. 8, a force sensor 510, a position corrector 532, a hand and tool self-weight corrector 534, an equation of motion processor 536, a forward kinematics processor 540 are further provided.

In FIG. 9, in response to sensor information from the force sensor 510, the position corrector 532 performs position correction of the sensor and the hand and tool self-weight corrector 534 performs hand and tool self-weight correction. Further, the equation of motion processor 536 performs processing of obtaining a solution of the equation of motion as shown in the above described equation (1), and outputs a correction value Δp. The track information p is corrected according to the correction value Δp, and thereby, correction processing of the joint angle θ as the target value is performed. Further, the forward kinematics processor 540 performs forward kinematics processing, obtains track information p' of the robot, and feeds it back to the track generation part 562. Furthermore, the forward kinematics processor 540 outputs information for specifying the position to the position corrector 532 and the hand and tool self-weight corrector 534. Note that the feedback of the track information p' of the robot to the track generation part 562 is for modification processing of the track based on p' or the like, and the feedback is not always necessary unless the modification processing or the like is performed.

The hand and tool self-weight correction is performed in the hand and tool self-weight corrector 534, and the position correction is performed in the position corrector 532. Here, the hand and tool self-weight correction is correction processing for cancelling out the influence by the self weight of the hand of the robot and the self weight of the tool gripped by the hand from the sensor information (force information) from the force sensor 510. Further, the position correction is correction processing for cancelling out the influence by the position of the force sensor 510 from the sensor information (force information). These hand and tool self-weight correction and position correction may be expressed by the following equation (3), for example.

$$\begin{pmatrix} fx \\ fy \\ fz \\ fu \\ fv \\ fw \\ 1.0 \end{pmatrix} = \begin{bmatrix} Mxx & Mxy & Mxz & Mxu & Mxv & Mxw & Bx \\ Myx & \ddots & & & \ddots & Myw & By \\ Mzx & & & & & Mzw & Bz \\ Mux & & & & & Muw & Bu \\ Mvx & \ddots & & & \ddots & Mvw & Bv \\ Mwx & Mwy & Mwz & Mwu & Mwv & Mww & Bw \\ 0.0 & 0.0 & 0.0 & 0.0 & 0.0 & 0.0 & 1.0 \end{bmatrix} \begin{pmatrix} Fx \\ Fy \\ Fz \\ Fu \\ Fv \\ Fw \\ 1.0 \end{pmatrix} \quad (3)$$

In the equation (3), Fx, Fy, Fz, Fu, Fv, Fw are force information and torque information as the sensor information from the force sensor 510. Further, Bx, By, Bz, Bu, Bv, Bw are bias terms. Furthermore, fx, fy, fz, fu, fv, fw as corrected sensor information (force information, torque information) are input to the equation of motion processor 536. Note that data includes fixed values, and the substantial number of correction coefficients is 6×7=42. These hand and tool self-weight correction and position correction are known correction processing, and their detailed explanation will be omitted.

1.5 Digital Filter Processing

It is desirable to obtain the solution of the equation of motion (an ordinary differential equation in a broad sense) in the equation of motion processor 536 in FIG. 9. In related art, to obtain the solution of the equation of motion, the Newton method, the Runge-Kutta method, or the like has been used. However, these methods are not suitable for realization as hardware, and the determination of stability is difficult. Further, there has been a problem that switching of responsiveness is hard to be accepted.

Accordingly, a digital filter is used as a method of solving the differential equation for addressing the above described problems.

1.5.1 Solving Method Using Digital Filter of Equation of Motion

The equation of motion is expressed in the form of the above described equation (1). Since the equation of motion is the linear differential equation, when an impulse response as a solution for impulse input is obtained, a solution for an arbitrary external force term may be obtained by convolution of the impulse response and the external force term.

Here, if the step of obtaining the solution of the equation of motion is regarded as a filter of outputting the solution (for example, location information) for the input of the sensor information of the force sensor, the step may be considered as a bipolar analog filter from the form of the equation (1).

That is, the solution of the equation of motion may be obtained as the output of the analog filter, and thus, by digitalizing the analog filter, the equation of motion can be solved using a digital filter.

Various methods of digitalizing an analog filter are known and, for example, the impulse invariance method may be used. This is a method of designing a digital filter that provides an impulse response having the same value as a value obtained by sampling of impulse responses of the analog filter in discrete time T. The impulse invariance method is a known method and its detailed explanation will be omitted.

Figure 10:
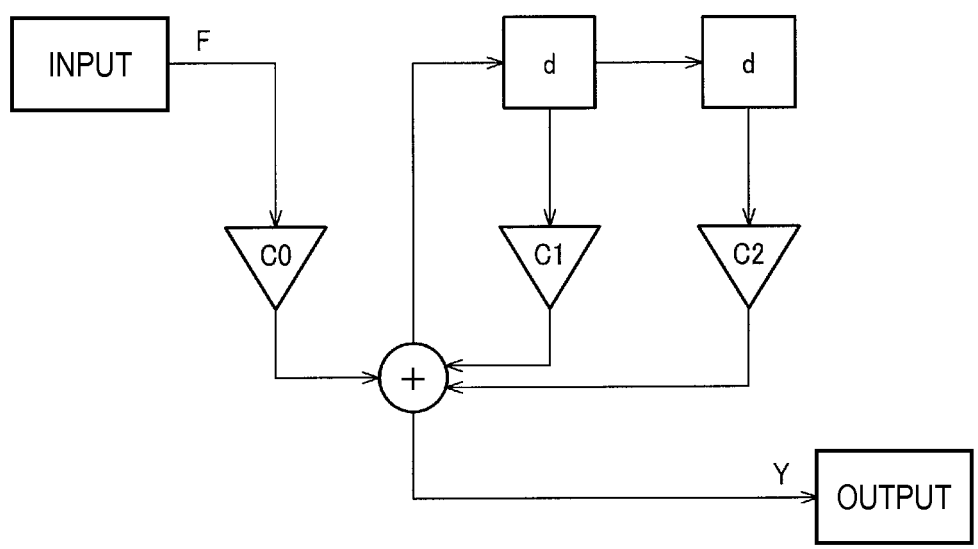
FIG. 10 shows a basic form of a digital filter when a solution of an equation of motion is obtained.

As a result, the solution of the differential equation can be obtained as the output of the digital filter. For the equation of motion, a bipolar digital filter as shown in FIG. 10 is obtained. In FIG. 10, d is a delay per sample, and $C_0$, $C_1$, $C_2$ are coefficients of the digital filter (digital filter parameters). The relationship between an input value F and an output value $Y_n$ of the digital filter in FIG. 10 may be expressed by the following equation (4).

$$Y_n = C_0 F + C_1 Y_{n-1} + C_2 Y_{n-2} \quad (4)$$

The processing using the digital filter is easy to be realized as hardware and the determination of stability is easy as will be described later. Further, by switching the coefficients of the digital filter, the characteristic (whether to move flexibly or rigidly or the like) may be switched or the responsiveness of the solution may be switched by switching the filter drive frequency.

1.5.2 Stability Determination of Digital Filter

In the impedance control, an unstable system may be formed depending on the settings of the mass term (m), the viscosity term (μ), and the elasticity term (k) of the equation of motion. In an extreme example, an oscillating system such that once force is applied to the robot, then, the vibration of the robot continues though no further contact is made may be formed. The system with lower stability (degree of stability) is not preferable for practical use, and it is desired to determine the stability of the system with respect to the equation of motion and take some measures unless the system is stable.

The solution of the equation of motion may be obtained using the above described Newton method, Runge-Kutta method, or the like, however, the determination of stability is impossible. Accordingly, processing of determining stability is separate from the processing of obtaining the solution, and it is generally known that the determination processing of stability is not easy.

In the method of the embodiment, the equation of motion is processed using the digital filter, and the determination of stability of the system with respect to the equation of motion is the determination of stability of the digital filter therefor. The determination of stability of the digital filter may be performed easily and it is acceptable to only determine whether or not the pole is within a unit circle.

Figure 11A:
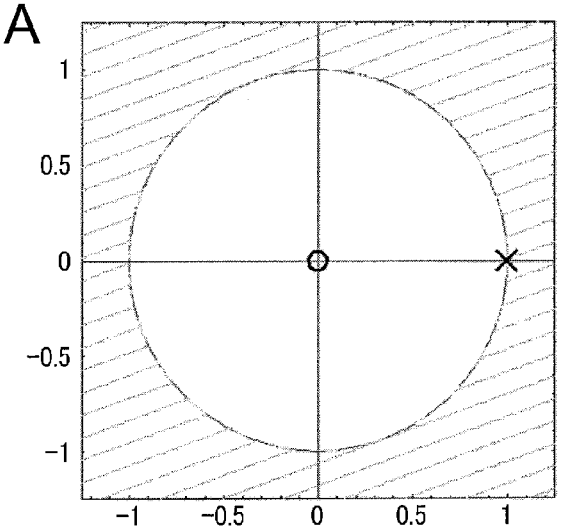
FIGS. 11A to 11C are explanatory diagrams of a stability determination method of the system.
Figure 11B:
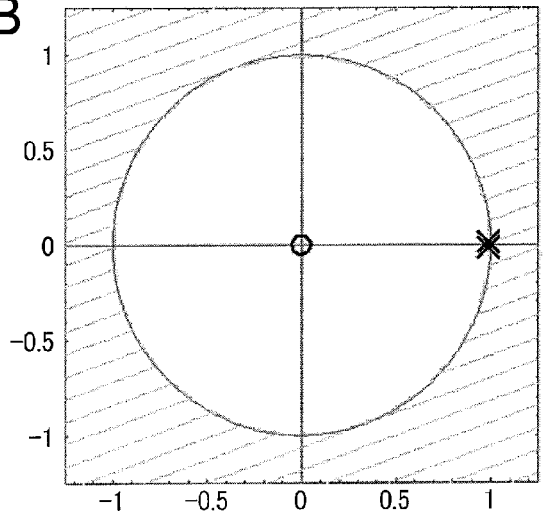
Figure 11C:
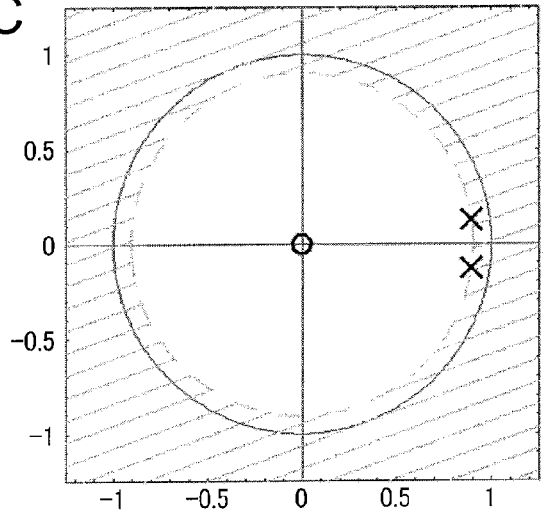

Specifically, FIGS. 11A to 11C show specific examples. These are the examples in which the pole is within the unit circle, and, if the pole is outside of the unit circle, the determination that the filter is not stable is made. Further, when the pole is in the location inwardly separate from the circumference of the unit circle to an extent as shown in FIG. 11C, there is no particular problem. However, when the pole is in the location significantly near the unit circle as shown in FIG. 11A (note that FIG. 11A shows the example in which two poles are not double root, but in the locations as near as possible), attention is required. This is because, depending on the mounting method of the digital filter, an error may be produced for the designed value. In the case where the error causes movement of the location of the pole toward outside of the unit circle, the digital filter with little margins of stability as shown in FIG. 11A may perform unstable operation when mounted though it is stable in design, and some measures are desired.

1.5.3 Configuration Example Using Digital Filter

Figure 12:
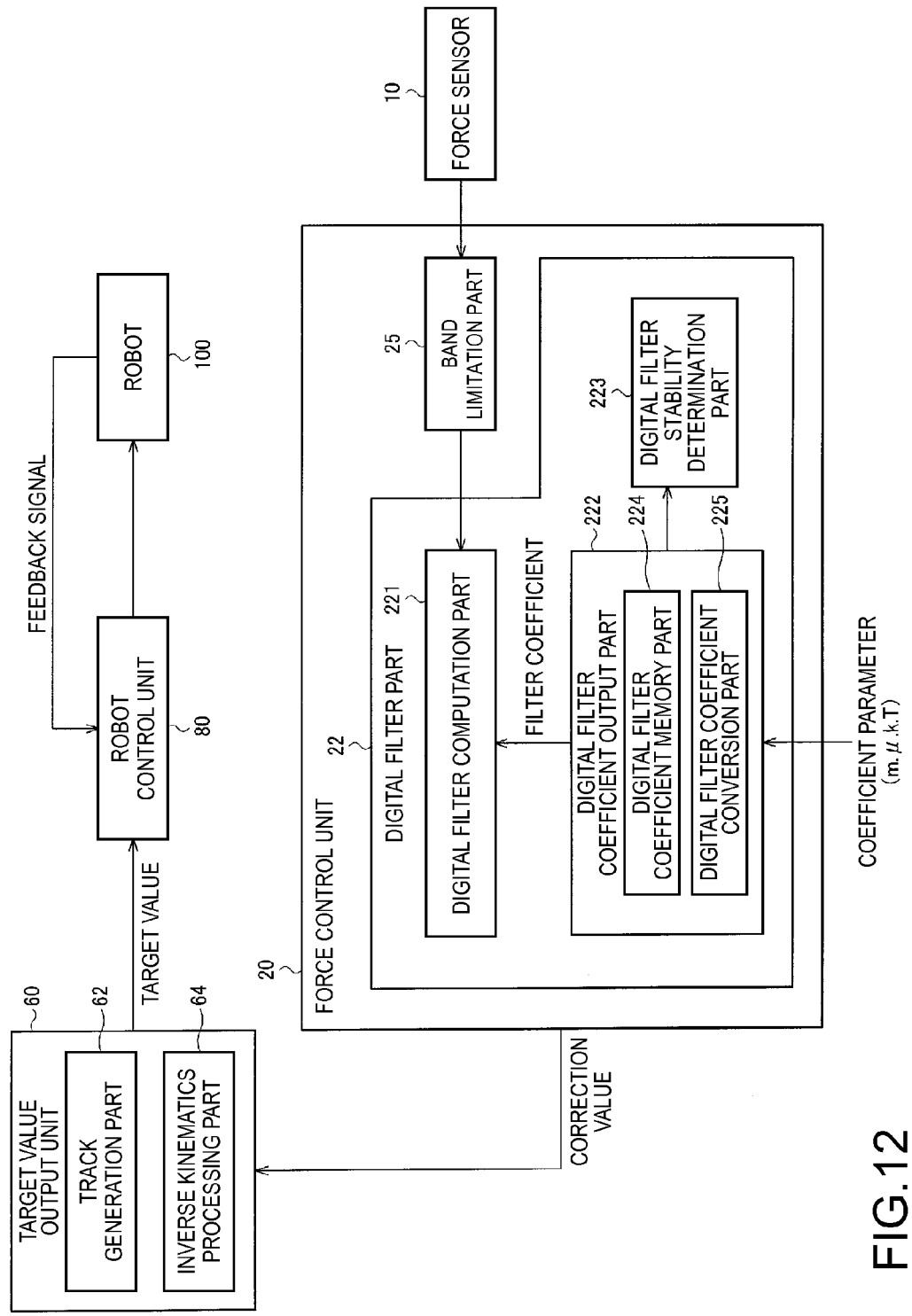
FIG. 12 shows a basic configuration example of a robot controller and a robot system using a digital filter.

FIG. 12 shows a configuration example of a robot controller, a robot system including the controller, and a sensor information device when the solution of the equation of motion is obtained using the digital filter. Note that the robot controller, the robot system, and the sensor information device of the embodiment are not limited to those having the configuration in FIG. 12, and various modifications can be made by omitting part of their component elements and adding other component elements.

The force sensor 10, the target value output unit 60, the robot control unit 80, and the robot 100 are the same as those in FIG. 1, and their detailed explanation will be omitted.

A force control unit 20 includes a digital filter 22. The digital filter 22 performs digital filter processing on sensor information from the force sensor (including information formed by performing correction processing and band limitation processing on the sensor information), and outputs an output value as a correction value to the target value output unit 60. Further, the force control unit 20 may include a band limitation part 25 that performs band limitation processing on the sensor information.

The digital filter 22 includes a digital filter computation part 221, a digital filter coefficient output part 222, and a digital filter stability determination part 223. The digital filter computation part 221 obtains the solution of the equation of motion by performing the digital filter processing based on sensor information and a digital filter coefficient. The digital filter coefficient output part 222 obtains the digital filter coefficient based on coefficient parameters (mass term m, viscosity term μ, and elasticity term k, and drive frequency T) of the equation of motion, and outputs the coefficient to the digital filter computation part 221 and the digital filter stability determination part 223. The digital filter stability determination part 223 performs determination of stability of the digital filter based on the digital filter coefficient.

The digital filter coefficient output part 222 may include a digital filter coefficient memory 224 and a digital filter coefficient conversion part 225. The digital filter coefficient conversion part 225 converts the coefficient parameters of the equation of motion into the digital filter coefficient. The digital filter coefficient memory 224 stores the converted digital filter coefficient. By storing plural digital filter coefficients in the digital filter coefficient memory 224 in advance, the movement characteristic of the robot and the responsiveness of the solution can be switched by switching the digital filter coefficient to be output.

Below, the first embodiment and the second embodiment that realize asymmetric impedance control as shown in FIG. 7D will be explained on the basis of the configuration in FIG. 12. The first embodiment is a basic form of the invention and an example of switching parameters of the control filter to be used in response to the external force direction and performing asymmetric impedance control. Further, the second embodiment is an example of changing control parameters when a predetermined control parameter change command or the like is issued, and performing asymmetric impedance control.

2. First Embodiment

2.1 Configuration

Figure 13:
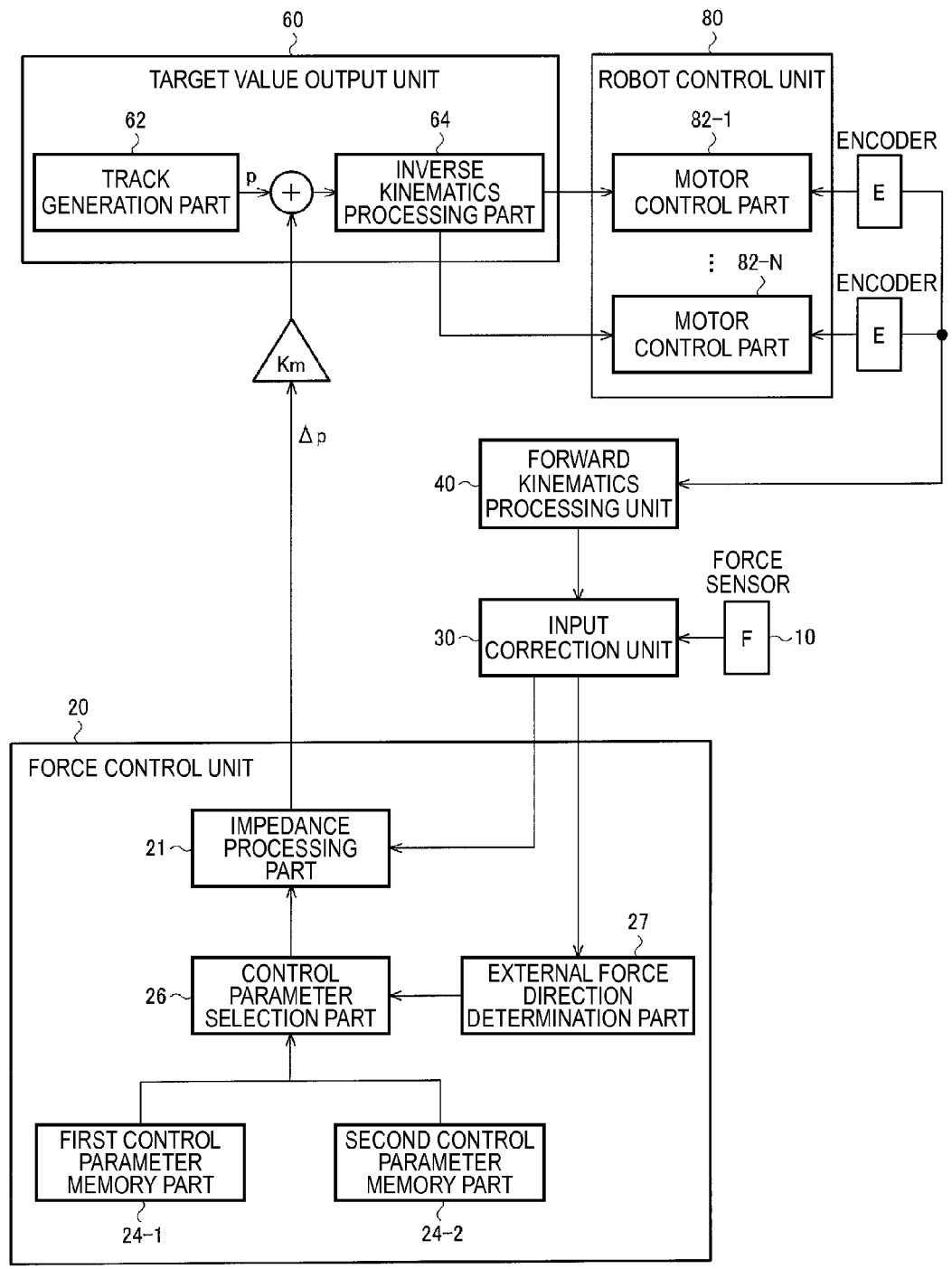
FIG. 13 shows a detailed system configuration example of the first embodiment.

FIG. 13 shows a configuration example of a robot controller according to the first embodiment.

The force sensor 10, the target value output unit 60 (the track generation part 62 and the inverse kinematics processor 64), the robot control unit 80 (the motor control part 82-1 to the motor control part 82-N), etc. are the same as those in FIG. 1, and their detailed explanation will be omitted. Further, an input correction unit 30 performs correction processing on detected sensor value (sensor information), and may include the position corrector 532, the hand and tool self-weight corrector 534, etc. in FIG. 9, for example. A forward kinematics processing unit 40 corresponds to the forward kinematics processor 540 in FIG. 9, and outputs a result of forward kinematics processing to the input correction unit 30, and the unit may output the result to the track generation part 62 according to need.

Further, the force control unit 20 of the robot controller includes an impedance processor 21, a first control parameter memory 24-1, a second control parameter memory 24-2, a control parameter selector 26, and an external force direction determination part 27. Note that the force control unit 20 of the embodiment is not limited to that having the configuration in FIG. 13, and various modifications can be made by omitting part of its component elements and/or adding other component elements.

Furthermore, the impedance processor 21 in FIG. 13 corresponds to the digital filter computation part 221 in FIG. 12 and operates in the same manner, and its explanation will be omitted. In addition, the first control parameter memory 24-1 and the second control parameter memory 24-2 in FIG. 13 correspond to the digital filter coefficient memory 224 in FIG. 12, and the control parameter selector 26 in FIG. 13 corresponds to the digital filter coefficient conversion part 225 in FIG. 12.

The first control parameter memory 24-1 and the second control parameter memory 24-2 respectively store different control parameters from each other. Here, the control parameter may be a coefficient parameter of an equation of motion, which will be described later, or a parameter of a digital filter. Further, an offset parameter may be stored as the control parameter. Here, the offset parameter refers to virtual displacement when external force is zero. The function of the control parameter memory may be realized using a memory such as a RAM, an HDD (hard disc drive), or the like, and, in practice, may be formed using one memory or the like or plural memories or the like.

Then, the external force direction determination part 27 determines the external force direction based on the detected sensor value (external force) after position correction acquired from the input correction unit 30, and provides notification of the external force direction to the control parameter selector 26.

Then, the control parameter selector 26 selects a control parameter to be used from among the control parameters stored in the first control parameter memory 24-1 and the second control parameter memory 24-2 based on the external force direction determined by the external force direction determination part 27, and outputs the parameter to the impedance processor 21. Further, when the control parameters stored in the first control parameter memory 24-1 and the second control parameter memory 24-2 are coefficient parameters of the equation of motion, processing of converting the coefficient parameters into parameters of the digital filter or the like is performed.

Further, in the embodiment, the digital filter having the same configuration as that of the digital filter shown in FIG. 10 may be used.

According to the processing using the digital filter shown in FIG. 10, realization as hardware is easy and a determination of stability is also easy.

2.2 Detailed Processing

Next, a flow of the digital filter processing performed by the force control unit in the embodiment will be explained using a flowchart in FIG. 14. Further, a specific example for explanation of the respective operation steps of the asymmetric impedance control in the case of FIG. 6A is shown in FIGS. 15A to 15E. Below, the flowchart will be explained with the specific example.

As the flow of the digital filter processing, first, an output time is waited (S101) and, at the output time, external force (external force value) F after position correction is acquired from the input correction unit 30 (S102).

Figure 15A:
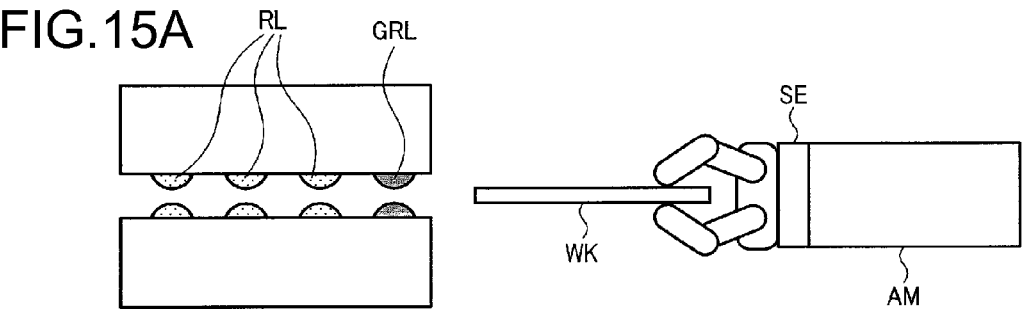
FIGS. 15A to 15E show specific examples for explanation of respective movement steps of asymmetric impedance control.
Figure 15B:
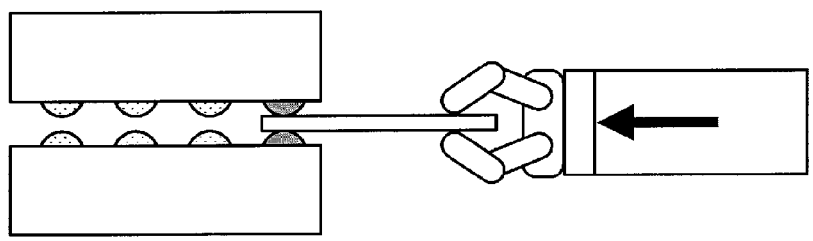

In the specific example shown in FIGS. 15A to 15E, at the time of FIG. 15A, the leading end of the work WK grasped by the arm AM of the robot is not in contact with the guide roller part GRL and no external force is detected (the detected sensor value is zero), and, at the time of FIG. 15B, rightward external force received from the guide roller part GRL is detected. Note that, even when the detected sensor value is zero, the following processing may be performed.

Then, whether or not the signs of the previous external force value and the current external force value are the same is determined (S103). Here, the sign of the external force value refers to the external force direction. For example, when the sign of the external force value is "−", the external force direction is the rightward direction in the drawing (first direction) and, when the sign of the external force value is "+", the external force direction is the leftward direction in the drawing (second direction). That is, at step S103, whether or not the external force direction has changed is determined.

If the determination that the signs of the previous external force value and the current external force value are different is made, the determination that the external force direction has changed is made, and the control parameter corresponding to the current sign (external force direction) is set (S104) and processing at step S105 is performed.

For example, the external force direction in FIG. 15B is the rightward direction, and the sign of the external force value is "−". On the other hand, in the state of FIG. 15C, the roller part RL pulls in the work WK, and the external force direction is the leftward direction, and the sign of the external force value is "+". Therefore, the signs of the external force values are different between the state of FIG. 15B and the state of FIG. 15C. Accordingly, the control parameter selector 26 determines that the external force direction has changed and changes the control parameter. Note that, in the example, the first control parameter stored in the first control parameter memory 24-1 is set in the initial state and, when the external force direction changes, the control parameter to be used is changed to the second control parameter stored in the second control parameter memory 24-2.

On the other hand, if the determination that the signs of the previous external force value and the current external force value are the same is made, the determination that the external force direction has not changed is made, and the currently set control parameter is not changed and processing at step S105 is performed.

Figure 15C:
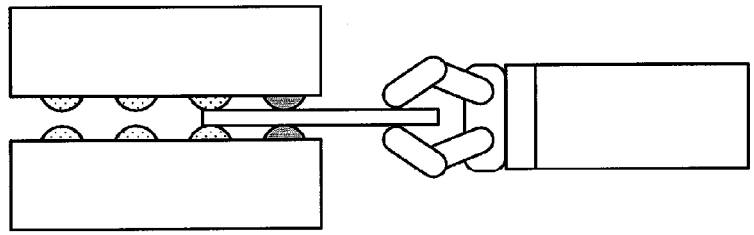
Figure 15D:
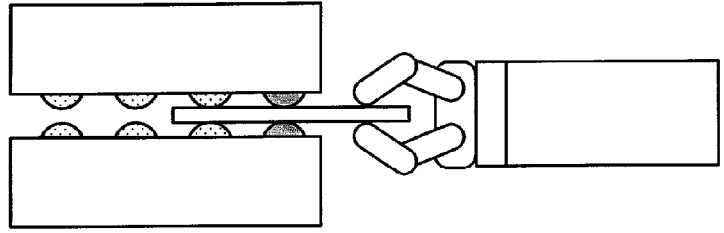
Figure 15E:
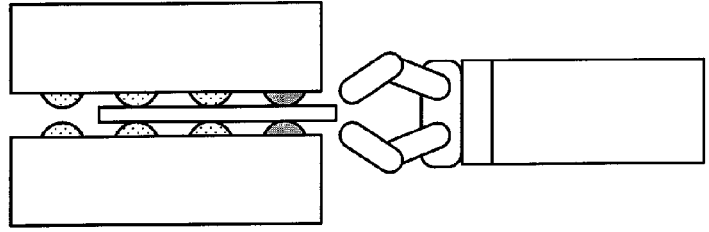

For example, the external force direction in FIG. 15C is the leftward direction and the sign of the external force value is "+". Further, also, in the states of FIGS. 15D and 15E, the external force direction is the leftward direction and the sign of the external force value remains "+", and the sign of the external force value does not change from the state of FIG. 15C to the state of FIG. 15E. Accordingly, here, the control parameter to be used is not changed.

Then, the equation (4) is calculated based on the set control parameter and $Y_n$ is obtained (S105), and the process returns to step S101. This is the flow of the digital filter processing of the embodiment.

Figure 16:
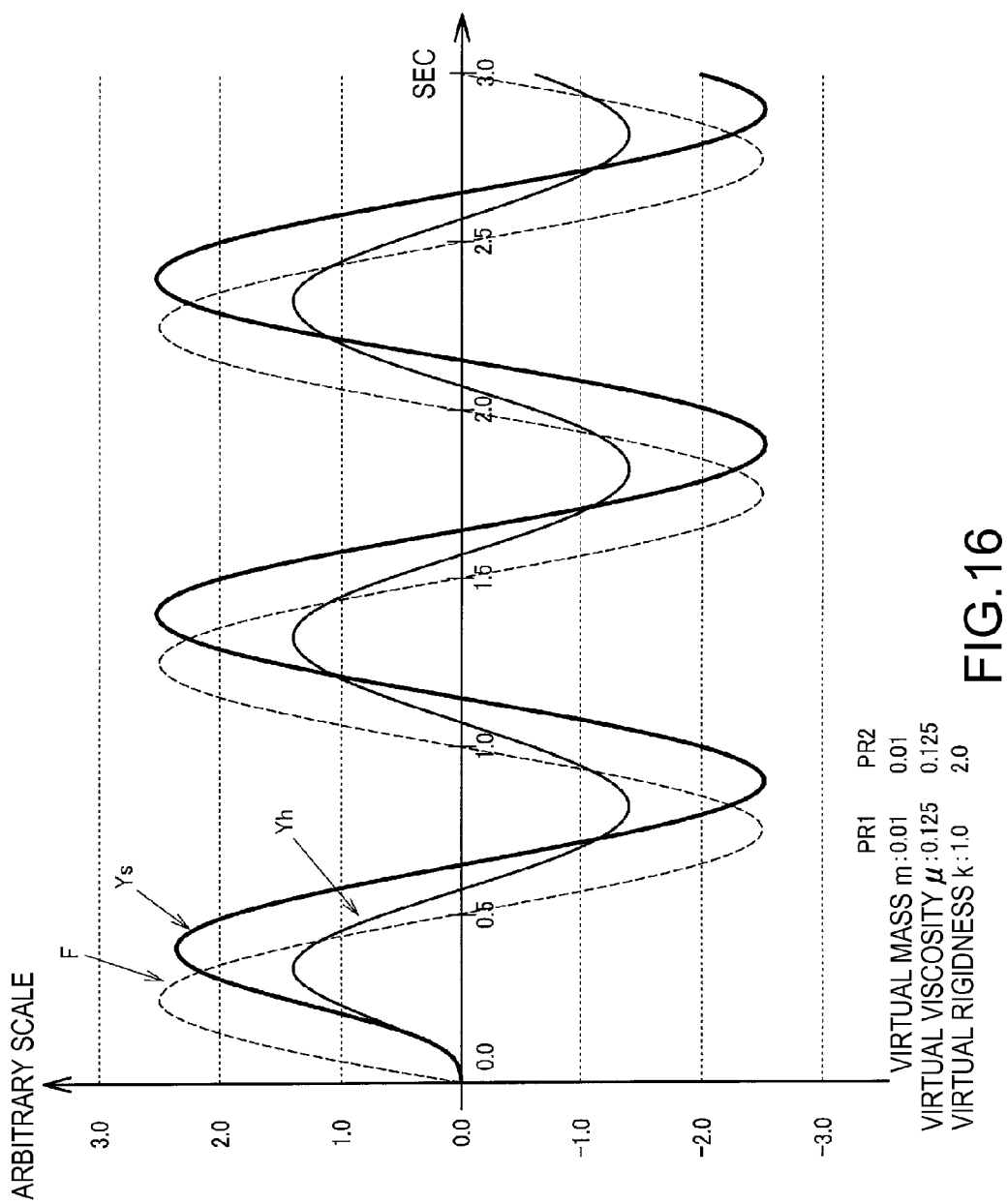
FIG. 16 shows a response example of symmetric impedance control of sinusoidal external force.
Figure 17:
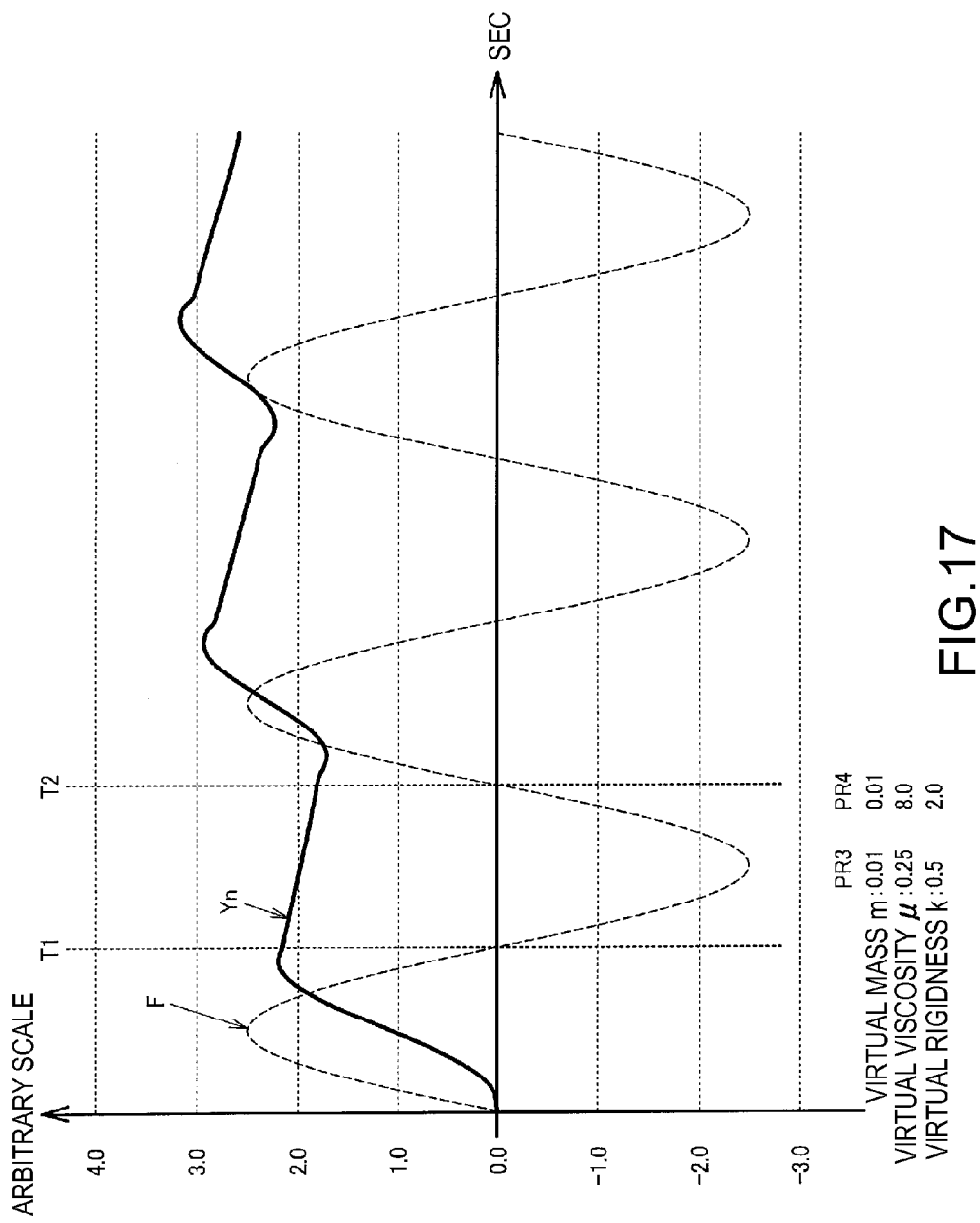
FIG. 17 shows a response example of asymmetric impedance control of sinusoidal external force.

Next, the response of the symmetric impedance control and the response of the asymmetric impedance control are compared using FIGS. 16 and 17.

First, FIG. 16 shows responses $(Y_s, Y_h)$ of the symmetric impedance control on sinusoidal external force F. In the graph of FIG. 16, the response to external force F when the coefficient parameters of the equation of motion (virtual mass, virtual viscosity, virtual rigidness) are set to PR1 shown in the same drawing is expressed by $Y_s$, and the response when the coefficient parameters are set to PR2 is expressed by $Y_h$. Note that, in FIGS. 16 and 17, the vertical axis indicates an arbitrary scale and the horizontal axis indicates time (second), the drive frequency is set to 125 microseconds (8 k samples/sec) the same as the frequency of the current control loop of the manipulator, and external force is sinusoidal wave having a period of one second.

In PR1 and PR2 of FIG. 16, the virtual masses m and the virtual viscosities μ are the same, but the virtual rigidness k is twice larger in PR2 than in PR1. Accordingly, the robot responds like the so-called flexible spring in setting of PR1, and responds like the more rigid spring in setting of PR2 twice that in setting of PR1. Note that, because of the viscosity term and mass term, the phase of the response in setting of PR1 or PR2 is out of the phase of external force.

As seen from FIG. 16, though the amplitude and the period are different, both the response $Y_s$ and the response $Y_h$ are sinusoidal wave symmetric with respect to the direction (sign) of the external force F.

Then, FIG. 17 shows the response $Y_h$ of the asymmetric impedance control on the sinusoidal external force F. $Y_h$ shown in the same drawing is the response (displacement, correction value) of the asymmetric impedance control of switching the coefficient parameters of the equation of motion in response to the external force direction.

As the coefficient parameters, PR3 and PR4 shown in the same drawing are used. The coefficient parameters set when the external force direction is the leftward direction (second direction) are PR3, and the coefficient parameters set when the external force direction is the rightward direction (first direction) are PR4. In PR3 and PR4 of FIG. 17, the virtual masses m are the same, but the virtual viscosity μ is 32 times larger in PR4 than in PR3 and the virtual rigidness k is four times larger in PR4 than in PR3. Accordingly, the robot responds like the more flexible spring in setting of PR3 than in the setting of PR4, and responds like the more rigid spring in setting of PR4 than in the setting of PR3.

For example, in the graph of FIG. 17, the external force turns from positive (leftward direction) to negative (rightward direction) at time T1, and the coefficient parameters of PR4 are set. Accordingly, the response $Y_n$ becomes harder to shift in the negative direction, and the amount of change of displacement with respect to the change of external force becomes smaller. On the other hand, for example, the external force turns from negative (rightward direction) to positive (leftward direction) at time T2, and the coefficient parameters of PR3 are set. Therefore, the response $Y_n$ becomes easier to shift in the positive direction, and the amount of change of displacement with respect to the change of external force becomes larger.

By performing the impedance control as shown in FIG. 17, the impedance control by which the amount of change of displacement with respect to the external force direction is asymmetric may be performed. As described above, by comparison between the curved lines of the response $Y_s$ shown in FIG. 16 and the response $Y_n$ shown in FIG. 17, the difference between the response of the symmetric impedance control and the response of the asymmetric impedance control is known.

The above described robot controller of the embodiment includes the force control unit 20 that outputs the correction value of the target track of the robot 100 based on the detected sensor value acquired from the force sensor 10, the target value output unit 60 that performs correction processing on the target track based on the correction value and obtains the target value, and outputs the obtained target value, and the robot control unit 80 that performs feedback control of the robot 100 based on the target value. Further, the force control unit 20 performs the first force control when the external force direction indicated by the detected sensor value is the first direction, and performs the second force control different from the first force control when the external force direction is the second direction (substantially) opposite to the first direction.

First, the force control obtains the correction value of the target track of the robot 100 based on the detected sensor value acquired from the force sensor 10, and outputs the obtained correction value.

Here, the detected sensor value (sensor information) may be the output value from the force sensor 10 itself or a value obtained by performing correction processing on the output value using the input correction unit 30. Further, the value may be a value obtained by band limitation processing using a band limitation part 25 (shown in FIG. 12). Furthermore, the value may be information mathematically equal to them.

Furthermore, the correction value is a value obtained by the force control unit 20 and used for correction of the target track by the target value output unit 60. For example, the correction value is the displacement shown in the graph of FIG. 7D. The displacement shown in the graph of FIG. 7D or the like is the response (output) of the impedance control for external force, but not a value indicating a distance or the like when the manipulator or the like of the robot 100 actually moves. Accordingly, the displacement is also referred to as virtual displacement for discriminating the displacement from the displacement when the manipulator or the like of the robot 100 actually moves. Note that the correction value before conversion processing may be restated as an intermediate value or an intermediate correction value.

Further, the target value output unit performs correction processing on the target track based on the correction value and obtains the target value.

Here, the target value is the target value in the feedback control of the robot 100, and the control in the robot control unit 80 is performed based on the target value. The target value may be acquired by performing the correction processing using the correction value on the target track.

Further, the target track may represent the change of the spatial target location of the end effector part (end point) of the robot 100 in a narrow sense. One target location is expressed by three-dimensional spatial coordinates xyz (rotation angles uvw around the respective axes may be added in consideration of position), for example, and the target track is a collection of the target locations. Note that the target track is not limited to that, but may be a collection of target joint angles of the robot 100. In the robot 100 having joints, when the angles of the respective joints are determined, the location of the end effector part is uniquely determined by forward kinematics processing. That is, in an N-joint robot, one target location may be represented by N joint angles (θ1 to θN), and, if a collection of the N joint angles is treated as one target joint angle, the target track may be considered as the set of target joint angles. Therefore, the correction value output from the force control unit 20 may be a value related to the location or a value related to the joint angle.

Figure 22A:
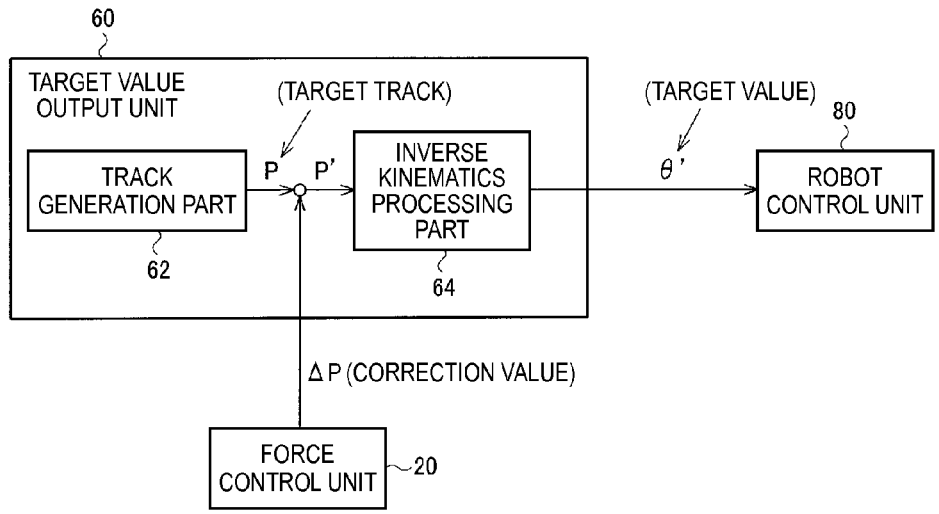
FIGS. 22A and 22B show specific system configuration examples of obtaining target tracks, correction values, and target values.
Figure 22B:
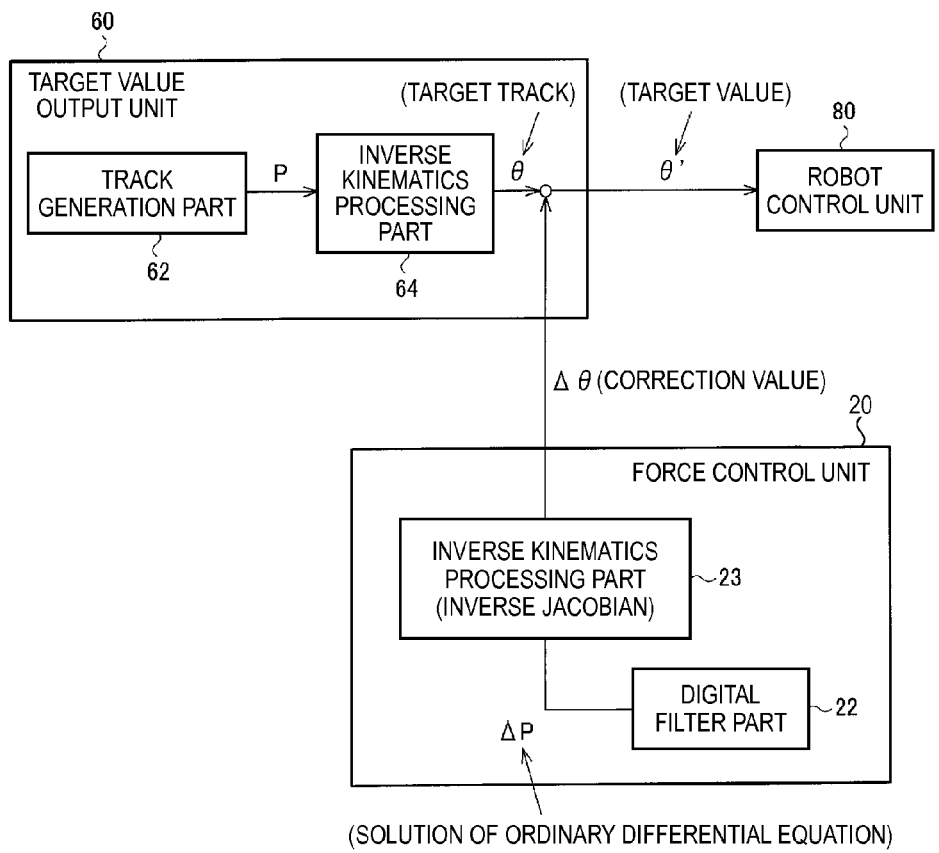

FIGS. 22A and 22B show specific examples. As will be described later, if the equation of motion of the equation (1) is used as the differential equation in the force control, the solution of the equation of motion is a value related to the location. Therefore, when the target track is the target location, the solution may be used as the correction value without change, and the system configuration example is as shown in FIG. 22A. Note that the target value may be the value related to the location or the value related to the joint angle, and the feedback control of the robot 100 using joint angles is generally assumed.

On the other hand, separately from the inverse kinematics processor 64 of the target value output unit 60, the case where the force control unit 20 includes an inverse kinematics processor 23 as shown in FIG. 22B is considered. For example, the case is a case where the times of processing and the processing rates are different between the target track generation processing in the target value output unit 60 and the correction value output processing in the force control unit 20 or the like. In this case, the target track is the target joint angle and the force control unit 20 performs conversion processing (for example, inverse kinematics processing) on the solution of the equation of motion and uses it as the correction value.

Further, the differential equation in the force control refers to an ordinary differential equation requiring obtainment of the solution in the force control. In a narrow sense, the equation may be a linear differential equation. In the narrower sense, the equation is an ordinary differential equation requiring obtainment of the solution so that the robot may behave as if it had desired properties (mass, viscosity, elasticity, or the like), and may be the equation of motion as shown in equation (1).

Furthermore, the force control unit 20 performs the first force control when the external force direction indicated by the detected sensor value is the first direction, and performs the second force control different from the first force control when the external force direction is the second direction opposite to the first direction. The details of first force control and the second force control will be described later.

Thereby, the impedance control by which the amount of change of displacement is asymmetric with respect to the external force direction can be performed. This is very effective in practical use of the robot, and force control with the higher operation adaptation may be realized.

Further, the force control unit 20 performs force control by which the amount of displacement change with respect to external force is the first amount of displacement change as the first force control when the external force direction is the first direction, and performs force control by which the amount of displacement change with respect to external force is the second amount of displacement change different from the first amount of displacement change as the second force control when the external force direction is the second direction.

Here, the amount of displacement change refers to the amount of change of displacement with respect to external force. For example, in the graph of FIG. 7D, the amount of displacement change refers to the gradient of the straight line indicating the displacement. In other words, when force is applied to the manipulator of the robot from a fixed direction, the instantaneous displacement of the manipulator is measured while the force is gradually changed, and graphically plotted as shown in FIGS. 7A to 7D, the gradient of the graph with respect to external force having a certain magnitude is the amount of displacement change.

Accordingly, for confirmation of the amount of displacement change, for example, the first external force, the second external force, the third external force having different magnitudes from each other are applied to the manipulator, and the displacement of the manipulator when the first external force is applied, the displacement when the second external force is applied, and the displacement when the third external force is applied are respectively obtained. Then, the difference between the displacement of the manipulator when the first external force is applied and the displacement when the second external force is applied and the difference between the displacement when the second external force is applied and the displacement when the third external force is applied may be confirmed as the amounts of displacement change. Note that, if the difference between the first external force and the second external force (the second external force and the third external force) is small, the same value as the gradient of the graph may be obtained. That is, the amount of displacement change may be the difference between the displacement when the first external force is applied and the displacement when the second external force different from the first external force is applied. In this regard, the difference between first external force and the second external force may be little. Here, "small" refers to "nearly zero".

Further, when the amount of displacement change is confirmed as described above, if the displacement becomes larger in proportion to the external force, it is known that the relationship as shown in FIG. 7A holds between the displacement and the external force, and, if the displacement does not become larger even when the external force is made larger, it is known that the relationship as shown in FIG. 7B holds between the displacement and the external force.

By performing force control by which the first amount of displacement change and the second amount of displacement change are different in the above described manner, the asymmetric impedance control may be realized. For example, the force control by which the amount of displacement change is larger can be performed when the external force in the first direction is detected, and the force control by which the amount of displacement change is smaller can be performed when the external force in the second direction is detected. That is, the force controls as shown in the graph of FIG. 7D can be performed.

Further, the force control unit 20 performs the first force control of outputting the first correction value corresponding to the first amount of displacement change when the external force direction is the first direction, and performs the second force control of outputting the second correction value corresponding to the second amount of displacement change when the external force direction is the second direction.

That is, the above described first force control also refers to the force control of outputting the first correction value, and the above described second force control also refers to the force control of outputting the second correction value.

Thereby, output of the different correction values or the like can be performed in response to the external force direction.

Further, the force control unit 20 may include the external force direction determination part 27 that determines the external force direction indicated by the detected sensor value.

Thereby, a determination of the external force direction or the like can be performed.

Furthermore, the force control unit 20 may have a control parameter memory 24 that stores plural sets of control parameters in force control, and a control parameter selector 26 that performs selection processing of the set of control parameters to be used from the sets of control parameters stored in the control parameter memory 24. Then, the force control unit 20 may perform selection processing of selecting the first set of control parameters when the external force direction indicated by the detected sensor value is the first direction, perform selection processing of selecting the second set of control parameters when the external force direction is the second direction, obtain the solution of the differential equation in the force control using the selected set of control parameters, and output the correction value.

Here, the set of control parameters may be a set of coefficient parameters of the respective terms of the differential equation in the force control, or a set of parameters of the digital filter.

Further, the coefficient parameters of the respective terms of the differential equation refer to the constant term, the coefficient of the first-order differential term, the coefficient of the second-order differential term, . . . , the coefficient of the nth-order differential term in the differential equation. In the above described example of equation (1), m, μ, k are coefficient parameters.

On the other hand, the parameters of the digital filter refer to coefficients of the respective terms in equation (4). Specifically, they are $C_0$, $C_1$, $C_2$. Note that some parameters are different between the first set of parameters and the second set of parameters.

Note that, in the embodiment, the selection processing of the set of control parameters to be used for the impedance control is performed based on the external force direction, however, the selection processing may be performed based on the virtual displacement instead of the external force direction.

Thereby, by switching the set of control parameters to be used for the impedance control, realization of the asymmetric impedance control or the like may be achieved.

Further, when the external force direction indicated by the detected sensor value is the second direction, the force control unit 20 may perform weighting processing on the first correction value obtained by the first force control and the second correction value obtained by the second force control, obtain the third correction value, and output the obtained third correction value.

For example, the force control unit 20 may obtain the sum of the first correction value and second correction value after weighting processing as the third correction value.

Figure 18:
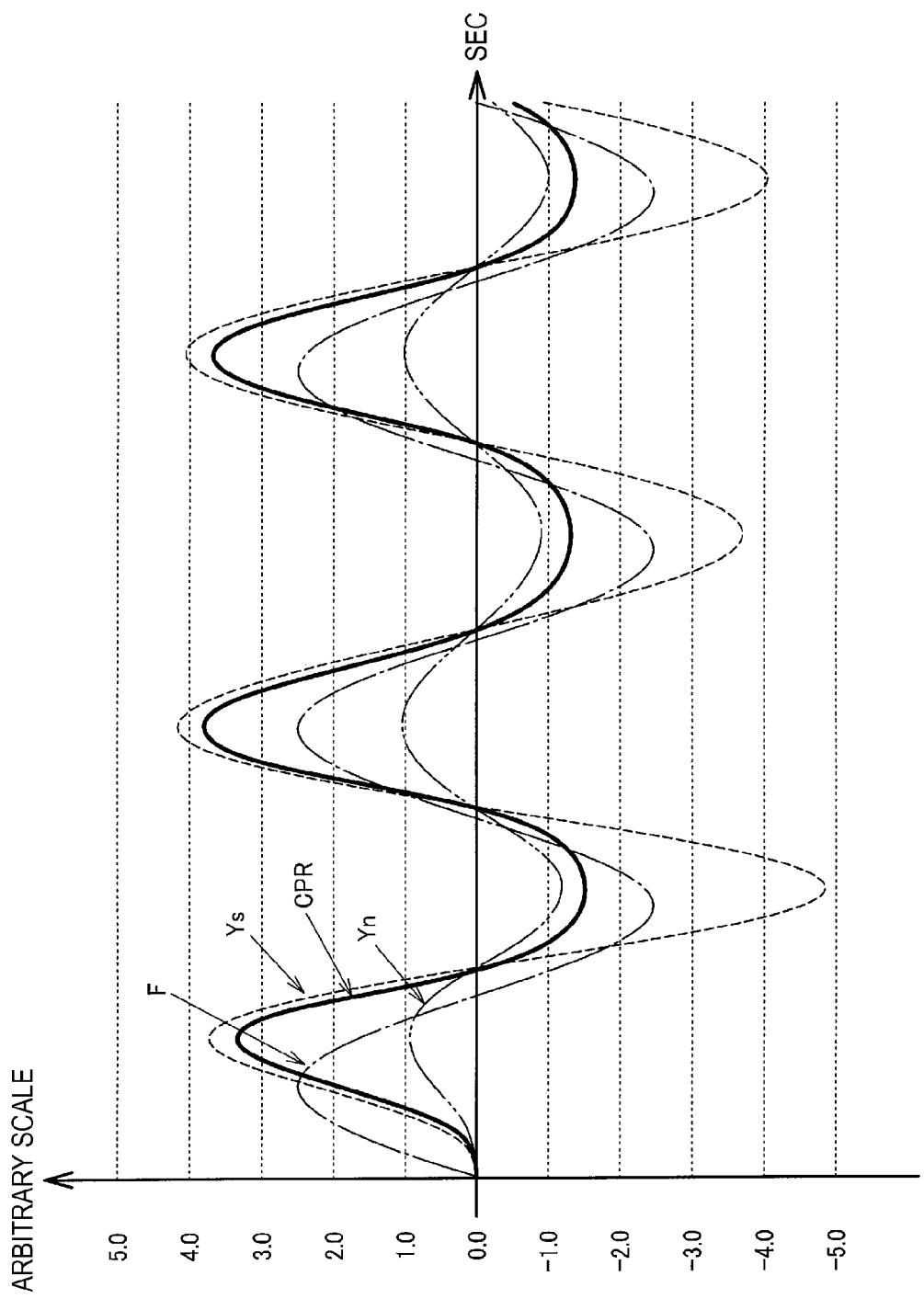
FIG. 18 shows examples of weighting addition of two impedance processing outputs.

As a specific example, FIG. 18 shows an example of weighting addition of two impedance processing outputs. This is the case where the same two sets of control parameters (PR1 and PR2) as those in FIG. 16 are used, however, in the example, not the parameters are switched, but the two sets of impedance processing are operated in parallel, and weighting addition of their outputs is performed.

In FIG. 18, the external force is F, the response when the impedance control is performed using the set of coefficient parameters PR1 of the equation of motion shown in FIG. 16 is performed on the external force F is $Y_s$, the response when the impedance control is performed using the set of coefficient parameters PR2 is $Y_h$, and the weighting addition value of the responses $Y_s$ and $Y_h$ is CPR. Note that, in this example, the weighting sum (CPR) is constantly obtained regardless of the external force direction.

Further, the weight W is expressed by equation (5), and the weighting addition value (output value, correction value) Output is expressed by equation (6). In the embodiment, thus obtained weighting addition value may be obtained as the correction value.

$$W = 0.5*(1.0 - \tan h(Y_h)) \quad (5)$$

$$\text{Output} = (1.0 - W) \times Y_s + W \times Y_h \quad (6)$$

Note that the weighting function has saturation characteristics in both positive and negative directions, and may be another function as long as it is a monotonically increasing function. Here, tan h or a sigmoid function (substantially the same as tan h) is used. The sigmoid function is a function of providing the maximum entropy state of the binary system, and appears in various situations. Note that the maximum entropy has no special significance.

Thereby, realization of the asymmetric impedance control or the like can be achieved by obtaining the output values when the digital filter processing is performed not by switching of the control parameters, but by using the parameters of the digital filter, and obtaining the correction value by performing the weighting addition of the respective output values.

Further, the force control unit 20 may have a digital filter 22 that obtains the solution of the differential equation in the force control as the correction value.

Thereby, the necessary processing of obtaining the solution of the differential equation in the force control can be performed using the digital filter, and realization as hardware is easier than that in the case where the Newton method, the Runge-Kutta method, or the like is used. Further by switching the digital filter to be used for the digital filter processing (for example, switching the filter coefficient), the response characteristic can be easily switched.

Furthermore, the force control unit 20 may obtain the solution of the differential equation in the force control as the correction value when the stability of the operation of the digital filter 22 obtaining the correction value is determined and the determination that the operation of the digital filter 22 is stable is made.

Thereby, a determination of the stability of the digital filter or the like can be performed. The coefficient parameters of the differential equation may form a practically impossible system (for example, an oscillating robot or the like) depending on the settings. Accordingly, the determination of the stability of the differential equation is necessary, and the determination becomes easier using the digital filter.

Further, the differential equation may be an equation of motion with the virtual mass term, the virtual viscosity term, and the virtual elasticity term as coefficient parameters.

Thereby, obtainment of the solution of the equation of motion or the like can be performed. Therefore, the robot 100 can be allowed to behave as if it had the mass corresponding the virtual mass term, the viscosity corresponding to the virtual viscosity term, and the elasticity corresponding to the virtual elasticity term.

In addition, the embodiment relates to a robot system including the above described robot controller (including the force control unit 20, the target value output unit 60, and the robot control unit 80) and the robot 100 that allows the respective parts to operate based on the target value acquired from the target value output unit 60.

Thereby, realization not only of the robot controller, but also of a robot system that executes processing of the embodiment or the like can be achieved.

Note that the case where the force control is performed using the digital filter has been described, however, the digital filter can be replaced by another component element. The case where the digital filter is replaced by another component element falls within the scope of the invention.

3. Second Embodiment

In the second embodiment, in the case where a predetermined control parameter change command is issued or the like, the control parameters are changed and the asymmetric impedance control is performed.

3.1 Configuration

Figure 19:
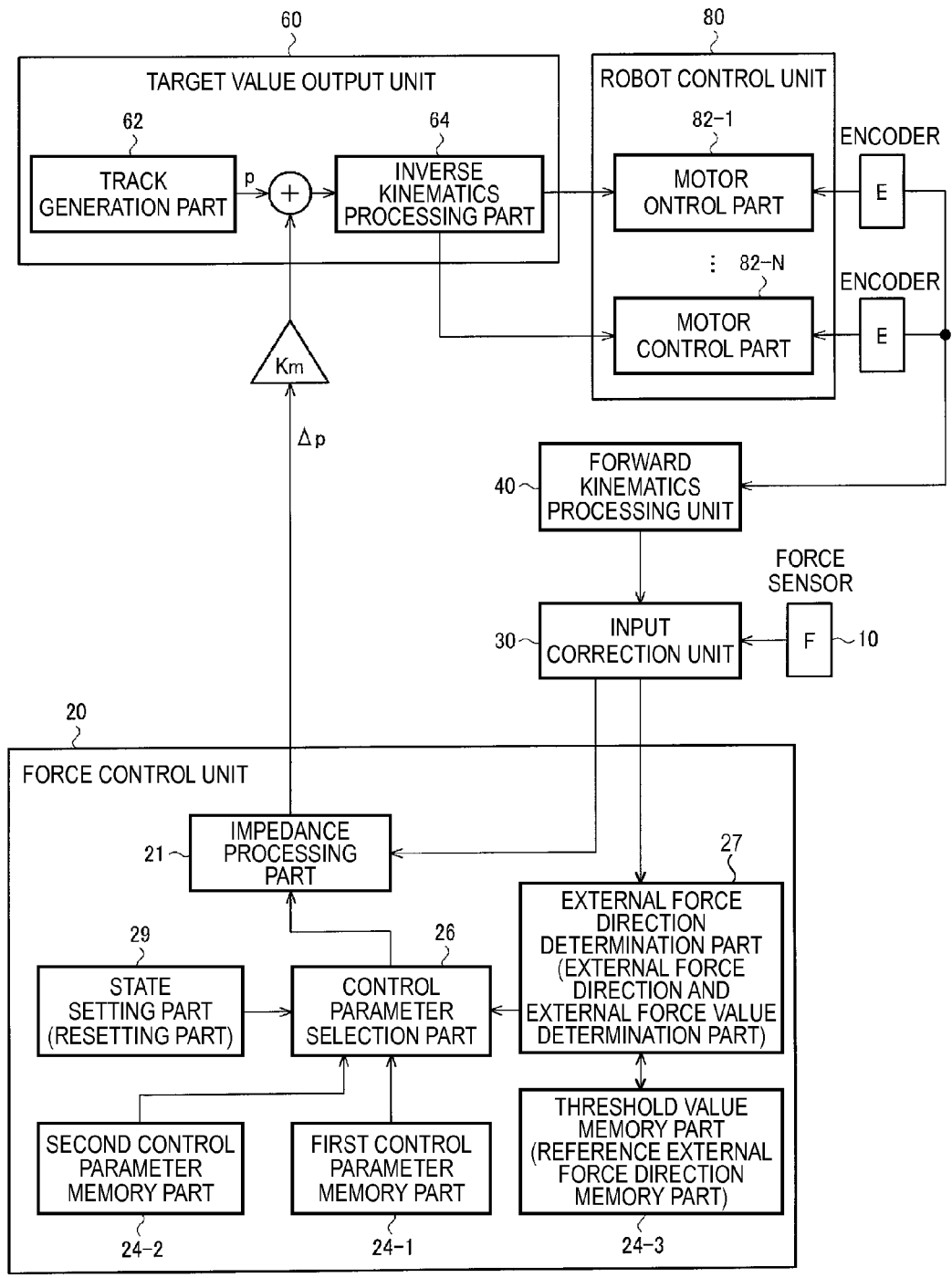
FIG. 19 shows a detailed system configuration example of the second embodiment.

FIG. 19 shows a configuration example of a robot controller according to the second embodiment.

A force control unit 20 of the robot controller includes an impedance processor 21, a first control parameter memory 24-1, a second control parameter memory 24-2, a threshold value memory (reference external force direction memory) 24-3, a control parameter selector 26, an external force direction determination part (external force direction and external force value determination part) 27, and a state setting part (resetting part) 29. Note that the force control unit 20 of the embodiment is not limited to that having the configuration in FIG. 19, and various modifications can be made by omitting part of its component elements and adding other component elements.

Here, the force sensor 10, the input correction unit 30, the forward kinematics processing unit 40, the target value output unit 60 (the track generation part 62 and the inverse kinematics processor 64), the robot control unit 80 (the motor control part 82-1 to the motor control part 82-N), the impedance processor 21, the first control parameter memory 24-1, the second control parameter memory 24-2, etc. are the same as those in FIG. 13, and their detailed explanation will be omitted and only the functional parts having the different configurations or performing different operations from those in FIG. 13 will be explained.

First, the threshold value memory (reference external force direction memory) 24-3 stores a predetermined threshold value to be used for determination processing as to whether or not the control parameters are changed and a reference external force direction, which will be described later. The function of the threshold value memory (reference external force direction memory) 24-3 may be realized using a memory such as a RAM, an HDD (hard disc drive), or the like. In practice, the memory may be formed using a common single memory or the like to that of the first control parameter memory 24-1 and the second control parameter memory 24-2, or they may be formed using different plural memories or the like.

Next, the external force direction determination part (external force direction and external force value determination part) 27 may determine whether or not the external force value is larger than the predetermined threshold value acquired from the threshold value memory 24-3 or the like based on the detected sensor value in addition to the determination of the external force direction.

Further, the control parameter selector 26 selects the control parameters to be used based on information indicating the external force direction and the magnitude relationship between the external force and the threshold value acquired from the external force direction determination part (external force direction and external force value determination part) 27. Note that, instead of the external force direction determination part 27, the control parameter selector 26 may determine whether or not the external force value is larger than the predetermined threshold value or the like.

Furthermore, when acquiring a control parameter change command or a reset signal, the state setting part (resetting part) 29 provides notification of the acquirement to the control parameter selector.

Note also that, in the second embodiment, the digital filter shown in FIG. 10 may be used like that in the first embodiment.

3.2 Detailed Processing

Figure 20:
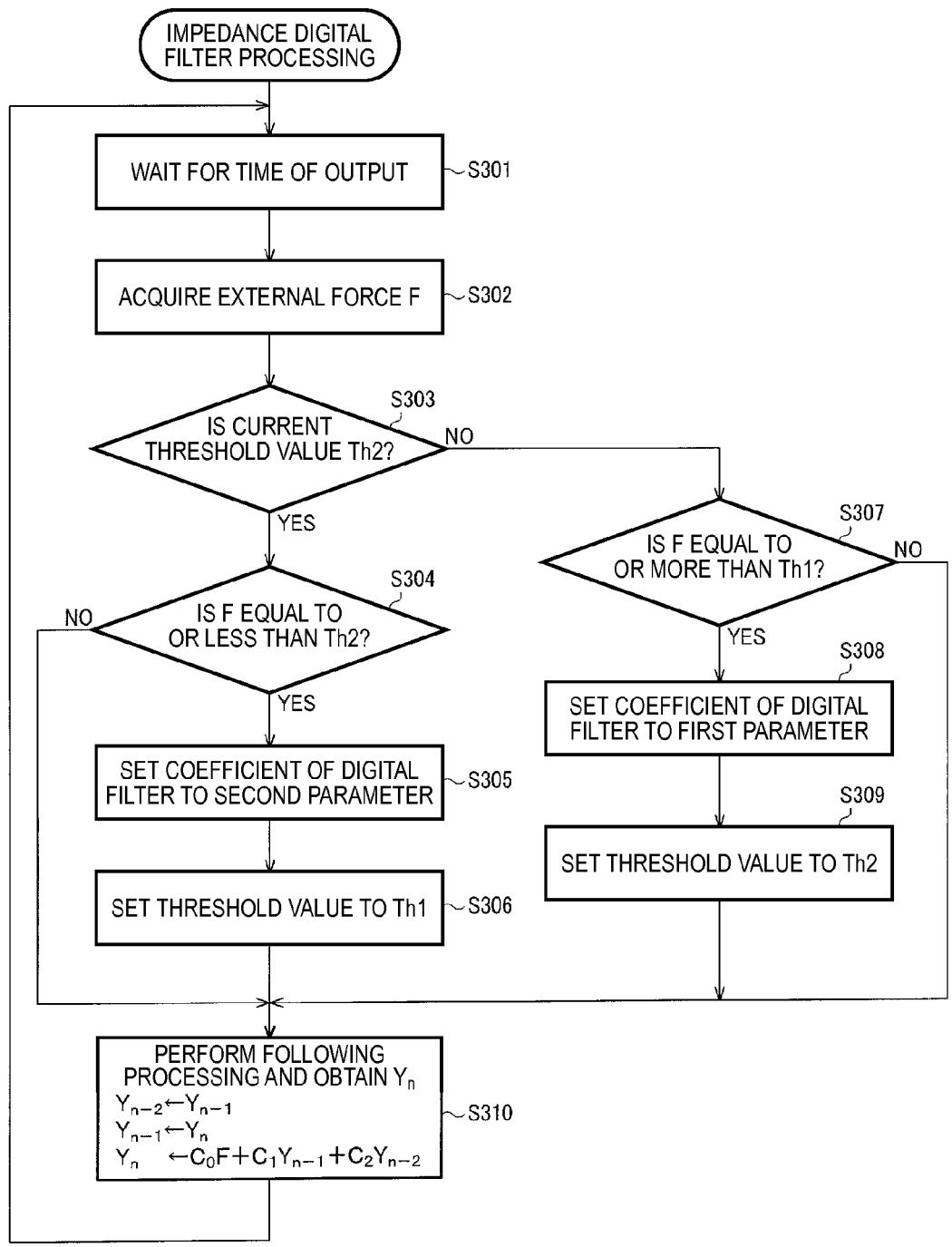
FIG. 20 is a flowchart for explanation of impedance digital filter processing of the second embodiment.

Next, a flow of the digital filter processing performed by the force control unit in the embodiment will be explained using a flowchart in FIG. 20.

Figure 14:
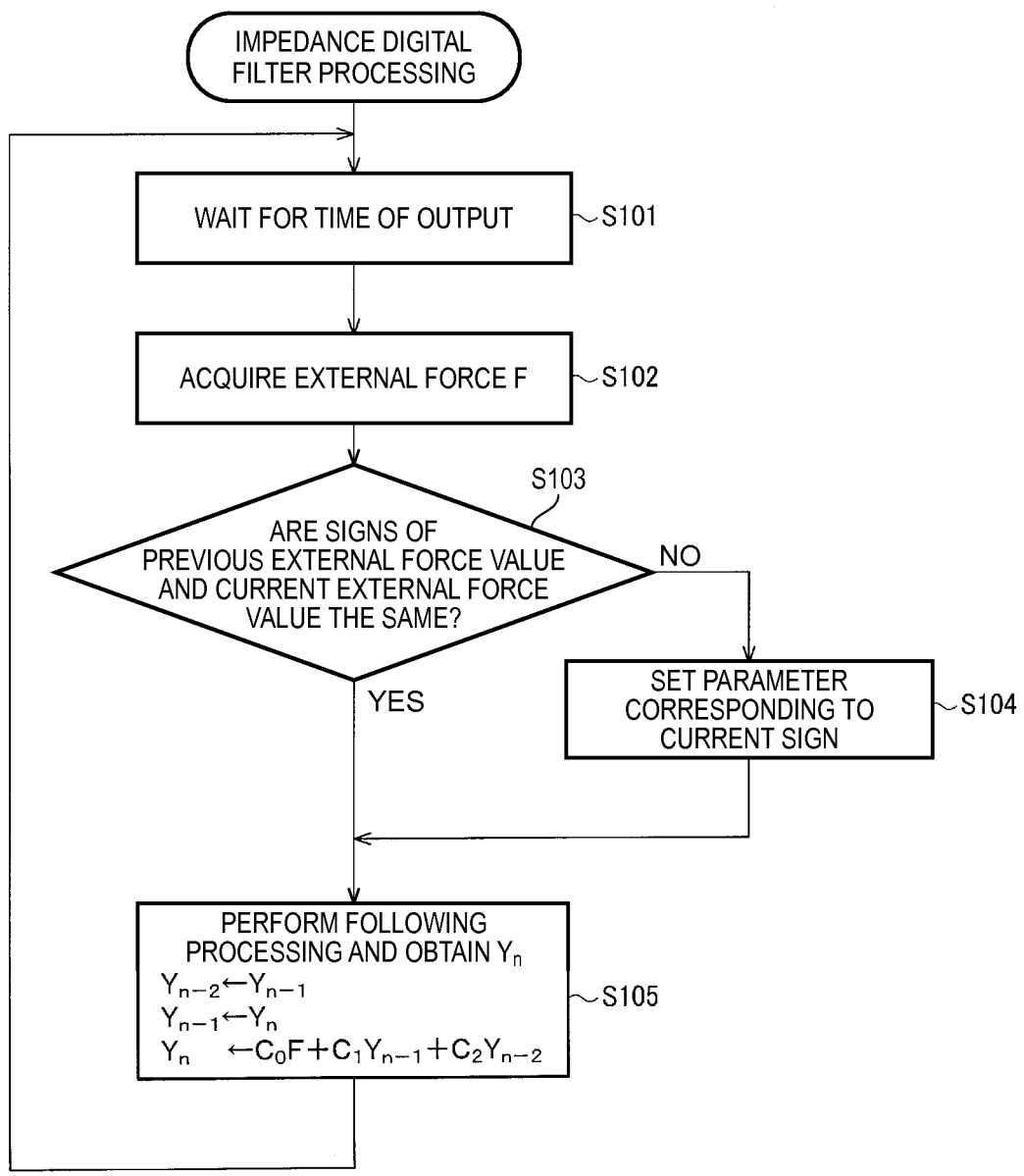
FIG. 14 is a flowchart for explanation of impedance digital filter processing of the first embodiment.

The flow to the steps S301, S302 is the same as that in FIG. 14. Note that, in the initial state of the embodiment, the first set of parameters PR1 are used as the set of parameters of the digital filter.

Figure 21:
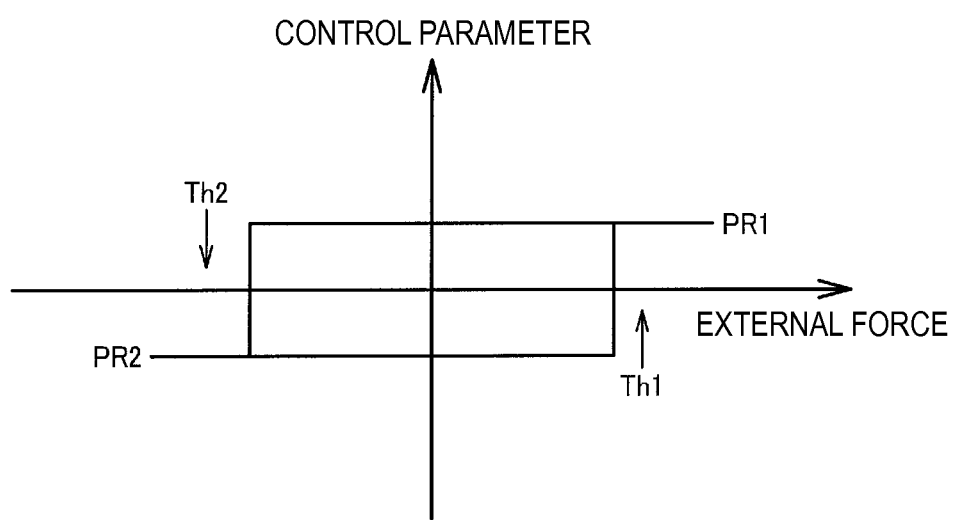
FIG. 21 is an explanatory diagram of changing processing of control parameters.

Further, in the embodiment, the set of parameters of the digital filter to be used are changed based on the external force value F (the direction and the magnitude of external force). FIG. 21 shows the changes using a graph with the horizontal axis of the external force value F and the vertical axis of the control parameter.

As described above, the first set of parameters PR1 are selected in the initial state, and it is assumed that the external force value F is larger than the second threshold value Th2 as shown in FIG. 21. Further, if the value is equal to or less than the second threshold value Th2, the set of parameters of the digital filter to be used should be changed to the second set of parameters PR2.

For the purpose, first, whether or not the currently set threshold value is the second threshold value Th2 is determined (S303).

Then, if the determination that the currently set threshold value is the second threshold value Th2 is made, whether or not the external force value F is equal to or less than the second threshold value Th2 is determined (S304).

If the determination that external force value F is equal to or less than the second threshold value Th2 is made, the set of parameters of the digital filter are set to the second set of parameters PR2 (S305).

Here, if the second threshold value Th2 is also used in comparison processing when whether or not to transit from the state using the second set of parameters (hereinafter, referred to as "second state") to the state using the first set of parameters (hereinafter, referred to as "first state"), in the case where the external force value F is a value near the second threshold value Th2, the set of parameters of the digital filter to be used may be frequently changed. When the set of parameters of the digital filter to be used are changed, the response characteristic also changes, and the frequency change is generally not preferable.

Therefore, in order to provide a hysteresis characteristic to the change control of the set of parameters of the digital filter, after step S305, the threshold value is changed to the first threshold value Th1 (S306). Thereby, the change of the set of parameters of the digital filter to be used may be prevented from frequently occurring.

On the other hand, if the determination that the external force value F is larger than the second threshold value Th2 is made at step S304, the changing processing of the set of parameters of the digital filter to be used is not performed.

Then, if the determination that the external force value F is larger than the second threshold value Th2 is made after the processing at step S306 or at step S304, processing at step S310 is performed and $Y_n$ is obtained (S310), and the process returns to step S301.

On the other hand, when the transition determination from the second state to the first state is performed, the external force value F and the first threshold value Th1 are compared as described above. Note that, in the case of the second state, the first threshold value Th1 is supposed to be set as the threshold value to be compared with the external force value F (see step S306).

Therefore, at step S303, if the determination that the currently set threshold value is the second threshold value Th2 is made (i.e., the determination that the first threshold value Th1 has been set is made), whether or not the external force value F is equal to or more than the first threshold value Th1 is determined (S307).

If the determination that external force value F is equal to or more than the first threshold value Th1 is made, the set of parameters of the digital filter are set to the first set of parameters PR1 (S308). Then, like step S306, in order to provide the hysteresis characteristic to the change control of the set of parameters of the digital filter to be used, the threshold value is changed to the second threshold value Th2 (S309).

On the other hand, if the determination that the external force value F is smaller than the first threshold value Th1 is made at step S307, the changing processing of the set of parameters of the digital filter to be used is not performed.

Then, if the determination that the external force value F is smaller than the first threshold value Th1 is made after the processing at step S309 or at step S307, processing at step S310 is performed and $Y_n$ is obtained (S310), and the process returns to step S301. This is the flow of the digital filter processing of the embodiment.

The force control unit 20 of the robot controller of the embodiment may perform changing processing of changing the set of control parameters to be used from the first set of control parameters to the second set of control parameters in the case where the determination that the predetermined control parameter change command is issued is made when the force control is performed using the first set of control parameters.

Here, the predetermined control parameter change command may be the comparison result between the external force value and the predetermined threshold value as described above, or the change command of the control parameters output from the state setting part 29.

For example, in the case where the predetermined control parameter change command is the former, when the comparison result that the external force value is larger than the predetermined threshold value is acquired by the control parameter selector 26, the changing processing of the set of control parameters to be used is performed.

On the other hand, for example, when the predetermined control parameter change command is the latter, the following processing is performed.

First, the force control unit 20 of the robot controller of the embodiment has the reference external force direction memory 24-3. The reference external force direction memory 24-3 may be the same memory as the threshold value memory or the like. Further, in the initial state, the set of control parameters (first control parameters) corresponding to the reference external force direction stored in the reference external force direction memory 24-3 are set.

Then, when the external force in the direction different from the reference external force direction is detected, the control parameter selector 26 selects the second set of control parameters different from the first set of control parameters. Note that the state in which the first set of control parameters are set is maintained until the changing command of the set of control parameters is output from the state setting part 29. Then, the selected set of control parameters are set only after the changing command of the set of control parameters is output from the state setting part 29. Further, if the state setting part 29 outputs the reset signal of commanding return to the initial state, the control parameter selector 26 resets the first set of control parameters.

Thereby, when the predetermined control parameter change command is issued, changing of the set of control parameters to be used or the like can be performed.

Further, when performing the force control using the second set of control parameters, the force control unit 20 may perform changing processing of changing the set of control parameters to be used to the first set of control parameters if the determination that the magnitude of the external force in the first direction exceeds the first threshold value is made, and when performing the force control using the first set of control parameters, the unit may perform changing processing of changing the set of control parameters to be used to the second set of control parameters if the determination that the magnitude of the external force in the second direction exceeds the second threshold value is made.

Here, the second direction refers to the opposite direction to the first direction on the same axis.

Further, here, the direction of the external force is discriminated and the magnitude of the external force is expressed by the positive number, i.e., the absolute value. On the other hand, in the above described example, as shown in FIG. 21, the magnitude of the external force in the first direction and the first threshold value are expressed by positive numbers and the magnitude of the external force in the second direction and the second threshold value are expressed by negative numbers. However, they are different in expression only and are actually substantially the same.

Thereby, as described above, the hysteresis characteristic may be provided to the change control of the set of control parameters, and avoidance of frequent changes of the set of control parameters to be used or the like can be performed.

Further, force control by which the magnitude of displacement of the robot when the first external force is applied to the force sensor and the magnitude of displacement of the robot when the second external force as force having the same magnitude in the opposite direction to the first external force is applied to the force sensor may be performed.

The embodiments have been explained in detail as described above, however, a person skilled in the art could easily understand that many modifications may be made without substantively departing from the new matter and effects of the invention. Therefore, the modification examples may be within the scope of the invention. For example, in the specification or the drawings, the terms described with broader or synonymous different terms at least once may be replaced by the different terms in any part of the specification or the drawings. Further, the configurations and the operations of the robot controller and the robot system are not limited to those explained in the embodiment, and various modifications may be implemented.

The entire disclosure of Japanese Patent Application No. 2012-006776 filed Jan. 17, 2012 is expressly incorporated by reference herein.

What is claimed is:

1. A robot controller comprising:
a force control unit that performs a first force control when an external force direction indicated by a detected sensor value is a first direction, and performs a second force control different from the first force control when the external force direction is a second direction substantially opposite to the first direction; and
a robot control unit that controls operation of the robot based on a result performed by the force control unit.

2. The robot controller according to claim 1, wherein the force control unit performs force control by which an amount of displacement change with respect to external force is a first amount of displacement change as the first force control when the external force direction is the first direction, and performs force control by which the amount of displacement change with respect to external force is a second amount of displacement change different from the first amount of displacement change as the second force control when the external force direction is the second direction.

3. The robot controller according to claim 2, wherein the force control unit performs the first force control of outputting a first correction value corresponding to the first amount of displacement change when the external force direction is the first direction, and performs the second force control of outputting a second correction value corresponding to the second amount of displacement change when the external force direction is the second direction.

4. The robot controller according to claim 1, wherein the force control unit includes an external force direction determination part that determines the external force direction indicated by the detected sensor value.

5. The robot controller according to claim 1, wherein the force control unit has a control parameter memory that stores plural sets of control parameters in force control, and a control parameter selector that selects the set of control parameters to be used from the sets of control parameters stored in the control parameter memory, and
the force control unit causes a first set of control parameters to be selected when the external force direction indicated by the detected sensor value is the first direction, a second set of control parameters to be selected when the external force direction is the second direction, and obtains a solution of a differential equation in force control as the correction value using the selected set of control parameters and outputs the correction value.

6. The robot controller according to claim 5, wherein the force control unit changes the set of control parameters to be used from the first set of control parameters to the second set of control parameters if a predetermined control parameter change command has been issued when performing force control using the first set of control parameters.

7. The robot controller according to claim 6, wherein the force control unit changes the set of control parameters to be used to the first set of control parameters if a magnitude of external force in the first direction has exceeded a first threshold value when performing force control using the second set of control parameters, and changes the set of control parameters to be used to the second set of control parameters if a magnitude of external force in the second direction has exceeded a second threshold value when performing force control using the first set of control parameters.

8. The robot controller according to claim 1, wherein the force control unit weights a first correction value obtained by the first force control and a second correction value obtained by the second force control to obtain a third correction value and outputs the obtained third correction value when the external force direction indicated by the detected sensor value is the second direction.

9. The robot controller according to claim 1, wherein the force control unit has a digital filter that obtains a solution of a differential equation in force control as the correction value.

10. The robot controller according to claim 9, wherein the force control unit determines stability of an operation of the digital filter of obtaining the correction value, and obtains the solution of the differential equation in force control as the correction value if the operation of the digital filter is stable.

11. The robot controller according to claim 9, wherein the differential equation is an equation of motion having a virtual mass term, a virtual viscosity term, and a virtual elasticity term as coefficient parameters.

12. A robot system comprising:
the robot controller according to claim 1;
a target value output unit that obtains a target value by performing correction processing on the target track based on the correction value and outputs the obtained target value; and
a robot that moves respective parts based on the target value acquired from the target value output unit.

13. A robot control method comprising:
obtaining, by a processor, a solution of a differential equation in force control as a correction value of a target track of a robot based on a detected sensor value acquired from a force sensor;
performing, by the processor, a first force control when an external force direction indicated by the detected sensor value is a first direction;
performing, by the processor, a second force control different from the first force control when the external force direction is a second direction substantially opposite to the first direction;
obtaining, by the processor, a target value by performing correction processing on the target track based on the correction value and outputting the obtained target value; and
performing, by the processor, feedback control of the robot based on the target value.

14. The robot control method according to claim 13, further comprising:
performing, by the processor, force control by which an amount of displacement change with respect to external force is a first amount of displacement change as the first force control when the external force direction is the first direction; and
performing, by the processor, force control by which the amount of displacement change with respect to external force is a second amount of displacement change different from the first amount of displacement change as the second force control when the external force direction is the second direction.

* * * * *